US012525330B2

(12) United States Patent
Reiterer et al.

(10) Patent No.: US 12,525,330 B2
(45) Date of Patent: Jan. 13, 2026

(54) METHOD OF DETERMINING A BOLUS TO BE ADMINISTERED BY AN INSULIN DELIVERING DEVICE

(71) Applicant: Roche Diabetes Care, Inc., Indianapolis, IN (US)

(72) Inventors: Florian Reiterer, Linz (AT); Luigi del Re, Linz (AT)

( * ) Notice: Subject to any disclaimer, the term of this patent is extended or adjusted under 35 U.S.C. 154(b) by 1080 days.

(21) Appl. No.: 17/158,991

(22) Filed: Jan. 26, 2021

(65) Prior Publication Data

US 2021/0151163 A1    May 20, 2021

Related U.S. Application Data

(63) Continuation of application No. PCT/EP2019/069767, filed on Jul. 23, 2019.

(30) Foreign Application Priority Data

Jul. 27, 2018  (EP) ..................................... 18185974

(51) Int. Cl.
  *G16H 20/17*   (2018.01)
  *A61M 5/172*   (2006.01)

(52) U.S. Cl.
  CPC .......... *G16H 20/17* (2018.01); *A61M 5/1723* (2013.01); *A61M 2205/3569* (2013.01); *A61M 2205/502* (2013.01)

(58) Field of Classification Search
  CPC . A61B 5/14532; A61B 5/4839; A61B 5/7282; A61B 5/486; A61B 5/4866;
  (Continued)

(56) References Cited

U.S. PATENT DOCUMENTS

| 2008/0269585 A1* | 10/2008 | Ginsberg | ............... G16H 20/17 600/365 |
| 2010/0094112 A1* | 4/2010 | Heller | ................ A61B 5/14865 600/345 |

(Continued)

FOREIGN PATENT DOCUMENTS

EP    1 571 582 A2    9/2005

OTHER PUBLICATIONS

International Search Report and Written Opinion of the International Searching Authority, PCT/EP2019/069767, Oct. 16, 2019, 11 pages.

(Continued)

*Primary Examiner* — Jennifer Robertson
*Assistant Examiner* — Elina Sohyun Jang
(74) *Attorney, Agent, or Firm* — Bose McKinney & Evans LLP

(57) ABSTRACT

A method of determining an insulin bolus to be administered by an insulin delivering device is disclosed. According to the inventive method, glucose measurement data corresponding to glucose level measurement signals detected by a continuous glucose sensor are received. An insulin bolus to be administered by the insulin delivering device is determined based on a formula having expressions indicative of, for example, glucose level derived from the glucose measurement data, carbohydrate-to-insulin ratio (CIR) and an insulin sensitivity factor (ISF). The method can be carried out using a processor of a device such as insulin pen, an insulin pump, a remote control device configured to remotely control an insulin pump or an insulin pen, a continuous glucose meter, a controller of a continuous glucose meter, a blood glucose meter, and a portable electronic device such as a smart phone, smart watch or tablet.

7 Claims, 22 Drawing Sheets

(58) Field of Classification Search
CPC ............... A61B 5/425; A61M 5/1723; A61M 2005/14208; A61M 2230/201; A61M 2205/3569; A61M 2205/502; G16H 20/17
See application file for complete search history.

(56) References Cited

U.S. PATENT DOCUMENTS

| | | | |
|---|---|---|---|
| 2012/0226259 | A1 | 9/2012 | Yodfat et al. |
| 2015/0217055 | A1 | 8/2015 | Booth et al. |
| 2018/0075200 | A1* | 3/2018 | Davis .................... G16H 10/20 |
| 2018/0116573 | A1* | 5/2018 | Steiger .................... A61B 5/74 |
| 2018/0200435 | A1* | 7/2018 | Mazlish ............. A61B 5/14532 |

OTHER PUBLICATIONS

Kirchsteiger et al., Direct Continuous Time System Identification of MISO Transfer Function Models applied to Type 1 Diabetes, Proceedings of the 50th IEEE Conference on Decision and Control and European Control Conference (CDC-ECC), 2011, pp. 5176-5181.

Kirchsteiger et al., Continuous-time interval model identification of blood glucose dynamics for type 1 diabetes, International Journal of Control, 2014, vol. 87, No. 7, pp. 1454-1466.

Kirchsteiger et al., A Model Based Bolus Calculator for Blood Glucose Control in Type 1 Diabetes, Proceedings of the 2014 American Control Conference (ACC), Jun. 2014, pp. 5465-5470.

Kirchsteiger et al., Estimating Interval Process Models for Type 1 Diabetes for Robust Control Design, Proceedings of the 18th IFAC World Congress, Milano, Italy, Aug. 2011, pp. 11761-11766.

Walsh et al., Confusion Regarding Duration of Insulin Action: A Potential Source for Major Insulin Dose Errors by Bolus Calculators, Journal of Diabetes Science and Technology, 2014, vol. 8, No. 1, pp. 170-178.

Zschornack et al., Evaluation of the Performance of a Novel System for Continuous Glucose Monitoring, Journal of Diabetes Science and Technology, Jul. 2013, vol. 7, Issue 4, pp. 815-823.

Freckmann et al., Performance Evaluation of Three Continuous Glucose Monitoring Systems: Comparison of Six Sensors per Subject in Parallel, Journal of Diabetes Science and Technology, Jul. 2013, vol. 7, Issue 4, pp. 842-853.

Percival et al., Modeling the Effects of Subcutaneous Insulin Administration and Carbohydrate Consumption on Blood Glucose, Journal of Diabetes Science and Technology, Sep. 2010, vol. 4, Issue 5, pp. 1214-1228.

Reiterer et al., Can We Use Measurements to Classify Patients Suffering from Type 1 Diabetes into Subcategories and Does It Make Sense?, Springer International Publishing, Switzerland, 2016, pp. 57-78.

Heinemann, Variability of Insulin Absorption and Insulin Action, Diabetes Technology & Therapeutics, 2002, vol. 4, No. 5, pp. 673-682.

Reiterer et al., Identification of Diurnal Patterns in Insulin Action from Measured CGM Data for Patients with T1DM, 2015 European Control Conference (ECC), Jul. 2015, pp. 1-6.

Reiterer et al., Performance Assessment of Estimation Methods for CIR/ISF in Bolus Calculators, Linz Center of Mechatronics (LCM) in the Framework of the Austrian COMET-K2 Program, IFAC-PAPERSONLINE, Jan. 2015, vol. 48, No. 20, pp. 231-236.

* cited by examiner

METHOD OF DETERMINING A BOLUS TO BE ADMINISTERED BY AN INSULIN DELIVERING DEVICE

RELATED APPLICATIONS

This application is a continuation of PCT/EP2019/069767, filed Jul. 23, 2019, which claims priority to EP 18 185 974.5, filed Jul. 27, 2018, the entire disclosures of both of which are hereby incorporated herein by reference.

BACKGROUND

This disclosure refers to a method of determining a bolus to be administered by an insulin delivering device, a computer program product, and a data processing device.

Diabetes is an epidemic of global scale with an estimated 8.8% of the global population suffering from this disease in 2015 and an estimated 5 million diabetes related deaths that year. The estimated global health expenditure for diabetes in 2015 was 673 billion dollars, corresponding to roughly 12% of the overall budget. The majority of those costs are for the treatment of diabetes related complications. These complications often occur due to the incorrect dosage of diabetes medication. Both chronically elevated blood glucose (BG) levels (hyperglycemia) due to underdosing as well as dangerously low BG levels (hypoglycemia) due to overdosing should be avoided. Because of the high risk of hypoglycemia the correct dosing of insulin in type 1 diabetes mellitus (T1DM) is an especially challenging task. The immense interpatient and intrapatient variability in insulin needs asks for an adaption of treatment doses on a daily basis. For each meal an adequate dose of fast-acting insulin has to be injected to counteract the effect of the meal carbohydrates on the BG level (also referred to as a "meal bolus"). In order to determine meal insulin doses many patients rely on so-called bolus calculators (BCs). These are methods that determine the required insulin amount based on BG level, meal carbohydrates, as well as on patient and daytime specific BC settings. Specifically, values may be required for the carbohydrate-to-insulin ratio (CIR), and the insulin sensitivity factor (ISF). Also, the duration of insulin action (DIA) may be considered. Choosing those values correctly is difficult.

U.S. Publication No. 2012/0226259 A1 discloses a device, a system and a method for adjusting fluid delivery based on past or historical fluid delivery data and/or personal parameters of a user. Devices, and corresponding systems and methods, comprise a dispensing unit configured to deliver a fluid from a reservoir into the body of a user and a processor having instructions operating thereon to retrieve data relating to one or more time windows from a memory, assess a correction delivery for the one or more time windows based on the data, determine a new CIR (carbohydrate-to-insulin ratio) value for the one or more time windows if the correction delivery regularly follows a meal bolus and/or determine a new basal delivery profile for the one or more time windows if the correction delivery regularly precedes a meal bolus.

U.S. Publication No. 2015/0217055 A1 discloses a method of administering insulin including receiving blood glucose measurements of a patient at a data processing device from a glucometer. The blood glucose measurements shall be separated by a time interval. The method also includes receiving patient information at the data processing device and selecting a subcutaneous insulin treatment from a collection of subcutaneous insulin treatments. The selection is based on the blood glucose measurements and the patient information. The selection includes one or more of a subcutaneous standard program, a subcutaneous program without meal boluses, a meal-by-meal subcutaneous program without carbohydrate counting, a meal-by-meal subcutaneous program with carbohydrate counting, and a subcutaneous program for non-diabetic patients. The method also includes executing, using the data processing device, the selected subcutaneous insulin treatment.

SUMMARY

This disclosure teaches improved technology for determining an insulin bolus to be administered by an insulin delivering device, wherein the insulin bolus can be determined with higher reliability and accuracy for a person.

According to one aspect, a method of determining a bolus to be administered by an insulin delivering device is provided, the method comprising, in a data processing device having one or more processors: receiving glucose measurement data indicative of glucose level measurement signals detected by a continuous glucose sensor for a person; and determining by the one or more processors at a point in time, for the person, an insulin bolus to be administered by the insulin delivering device. The insulin bolus is determined based on a functional relationship provided by a formula comprising formula expressions indicative of a glucose level derived from the glucose measurement data; a carbohydrate-to-insulin ratio (CIR); and an insulin sensitivity factor (ISF). The determining further comprises at least one of the following: (i) for the carbohydrate-to-insulin ratio, determining a present CIR value based on CIR data indicative of the carbohydrate-to-insulin ratio for at least one of a time period from the start of a previous meal until before the start of a current meal on a present day comprising the point in time; the current meal; and the previous meal; and, (ii) for the insulin sensitivity factor, determining a present ISF value based on ISF data indicative of the insulin sensitivity factor for at least one of the time period from the start of the previous meal until before the start of the current meal on a present day comprising the point in time; the current meal; and the previous meal. The determining of the insulin bolus is conducted by a data processing device provided in a system selected from the following group: an insulin pen; an insulin pump; a remote control device configured to remotely control an insulin pump or an insulin pen; a continuous glucose meter; a controller of a continuous glucose meter; a blood glucose meter; and a portable device such as mobile phone, tablet computer or smart watch.

According to still a further aspect, a data processing device is provided, the device comprising one or more processors configured to determine a bolus to be administered by an insulin delivering device by the method outlined above. Further, a computer program product is provided.

Patient-specific (which can also be referred to as, in a more general way, user-specific or personalized) factors or formal expressions are applied for both the carbohydrate-to-insulin ratio and the insulin sensitivity factor. For at least one of such factors a present or new value is determined and applied for determining the insulin bolus for a user. Such new values may substitute a former or historical factor provided and potentially applied for bolus calculation before.

The insulin delivering device may be, for example, an insulin pump, an insulin pen or a syringe.

With respect to the start of the previous meal (starting point in time), the start may fall within one of the following time periods: time period of up to 15 min before ingesting first food from the previous meal, alternatively up to 10 min, up to 5 min, or up to 1 min before ingesting the first food from the previous meal. With respect to the start of the current meal (starting point in time), the start may fall within one of the following time periods: period of up to 15 min before but not including ingesting first food from the current meal, alternatively up to 10 min, up to 5 min, or up to 1 min before but not including ingesting the first food from the current meal.

The determining may further comprise determining of the insulin bolus based on a functional relationship provided by a formula comprising formula expressions indicative of total amount of insulin administered within a first time interval, and total amount of carbohydrates ingested by the person of interest within a second time interval.

The method may further comprise at least one of the following: outputting bolus data indicative of the insulin bolus to be administered by the insulin delivering device through an output device connected to the data processing device; and transmitting the output data to the insulin delivering device. For example, the output data may comprise at least one of video and audio data indicative of the insulin bolus to be administered by the insulin delivering device. The video data may be outputted through a display device. As an alternative or in addition, the output data may comprise control data configured to control operation of the insulin delivering device for administering the determined insulin bolus.

The insulin bolus (Bolus), for the person, may be determined based on the following formula:

$$\text{Bolus} = \frac{CHO}{CIR} + \frac{G_{pre} - G_{target}}{ISF} - IOB$$

wherein CHO is the carbohydrate content of a meal in grams, $G_{pre}$ is the preprandial glucose level, $G_{target}$ is a target glucose level for the postprandial glucose level, ISF is the insulin sensitivity value or factor, CIR is the carbohydrate-to-insulin value, and IOB is insulin-on-board. The glucose level, for the person, may be provided as follows: $G_{pre}$ is the preprandial glucose level, and $G_{target}$ is a target glucose level for the postprandial glucose level.

The determining of the insulin bolus may further comprise determining an insulin bolus for a lunch meal following a previous breakfast meal ingested on the present day; and determining, for the lunch meal, the present CIR value ($CIR_{present}^{lunch}$) and the present ISF value ($ISF_{present}^{lunch}$) as follows:

$$CIR_{present}^{lunch} = CIR_{ABC}^{lunch} \cdot \left(1 + f \cdot \frac{CIR_{SysId}^{breakfast} - CIR_{ABC}^{breakfast}}{CIR_{ABC}^{breakfast}}\right)$$

$$ISF_{present}^{lunch} = ISF_{ABC}^{lunch} \cdot \left(1 + f \cdot \frac{ISF_{SysId}^{breakfast} - ISF_{ABC}^{breakfast}}{ISF_{ABC}^{breakfast}}\right)$$

wherein
  $CIR_{ABC}^{lunch}$ and $ISF_{ABC}^{lunch}$ are, for an adapted bolus calculation ABC, the carbohydrate-to-insulin ratio and the insulin sensitivity values for the lunch meal derived from an average diurnal glucose level profile for the person;
  $CIR_{breakfast}^{ABC}$ and $ISF_{breakfast}^{ABC}$ are the carbohydrate-to-insulin ratio and the insulin sensitivity values for breakfast meal derived from the average diurnal glucose level profile for the person;
  $CIR_{SysId}^{breakfast}$ and $ISF_{SysId}^{breakfast}$ are the carbohydrate-to-insulin ratio and the insulin sensitivity values determined from, with respect to the breakfast meal, a postprandial glucose trajectory of the previous breakfast meal ingested earlier on the present day for the person; and
  factor f is a tuning parameter.

In an embodiment, the factor f may be a value in the range from 0 to 1. The factor f is used as a fractional threshold for limiting parameter change.

The above values or factors may be determined from the glucose measurement data provided. Alternatively, one or more of the values or factors may be provided to the data processing device directly without having it or them determined by the data processing device.

The determining of the insulin bolus may further comprise determining an insulin bolus for a dinner meal following a previous lunch meal ingested on the present day; and determining, for the dinner meal, the present CIR value ($CIR_{present}^{dinner}$) and the present ISF value ($ISF_{present}^{dinner}$) as follows:

$$CIR_{present}^{dinner} = CIR_{ABC}^{dinner} \cdot \left(1 + f \cdot \frac{CIR_{SysId}^{lunch} - CIR_{ABC}^{lunch}}{CIR_{ABC}^{lunch}}\right)$$

$$ISF_{present}^{dinner} = ISF_{ABC}^{dinner} \cdot \left(1 + f \cdot \frac{ISF_{SysId}^{lunch} - ISF_{ABC}^{lunch}}{ISF_{ABC}^{lunch}}\right)$$

wherein
  $CIR_{ABC}^{dinner}$ and $ISF_{ABC}^{dinner}$ are, for the adapted bolus calculation ABC, the carbohydrate-to-insulin ratio and the insulin sensitivity values for dinner meal derived from the average diurnal glucose level profile for the person;
  $CIR_{ABC}^{lunch}$ and $ISF_{ABC}^{lunch}$ are the carbohydrate-to-insulin ratio and the insulin sensitivity values for lunch meal derived from the average diurnal glucose level profile for the person;
  $CIR_{SysId}^{lunch}$ and $ISF_{SysId}^{lunch}$ are the carbohydrate-to-insulin ratio and the insulin sensitivity values determined from, with respect to the lunch meal, a postprandial glucose trajectory of the previous lunch meal ingested earlier on the present day for the person; and
  factor f is a tuning parameter.

The above values or factors may be determined from the glucose measurement data provided. Alternatively, one or more of the values or factors may be provided to the data processing device directly without having it or them determined by the data processing device.

With regard to the computer program product and the data processing, device the embodiments disclosed for the method above may apply mutatis mutandis.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
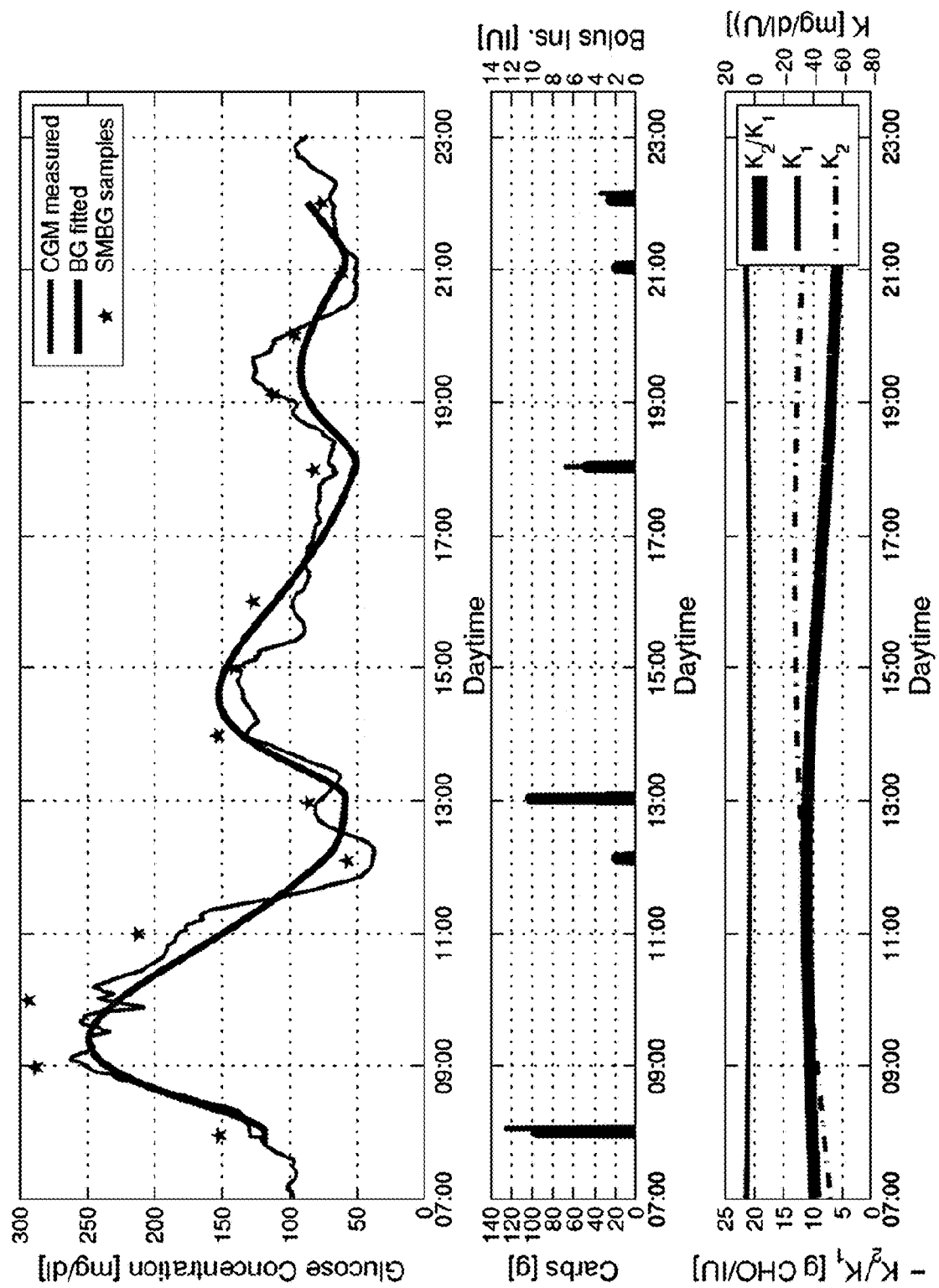
FIG. 1 is a graphic representation of measured glucose data and parameters identified from the model for a patient (patient 0013) for day 2 and FIT=67,87%.
Figure 2:
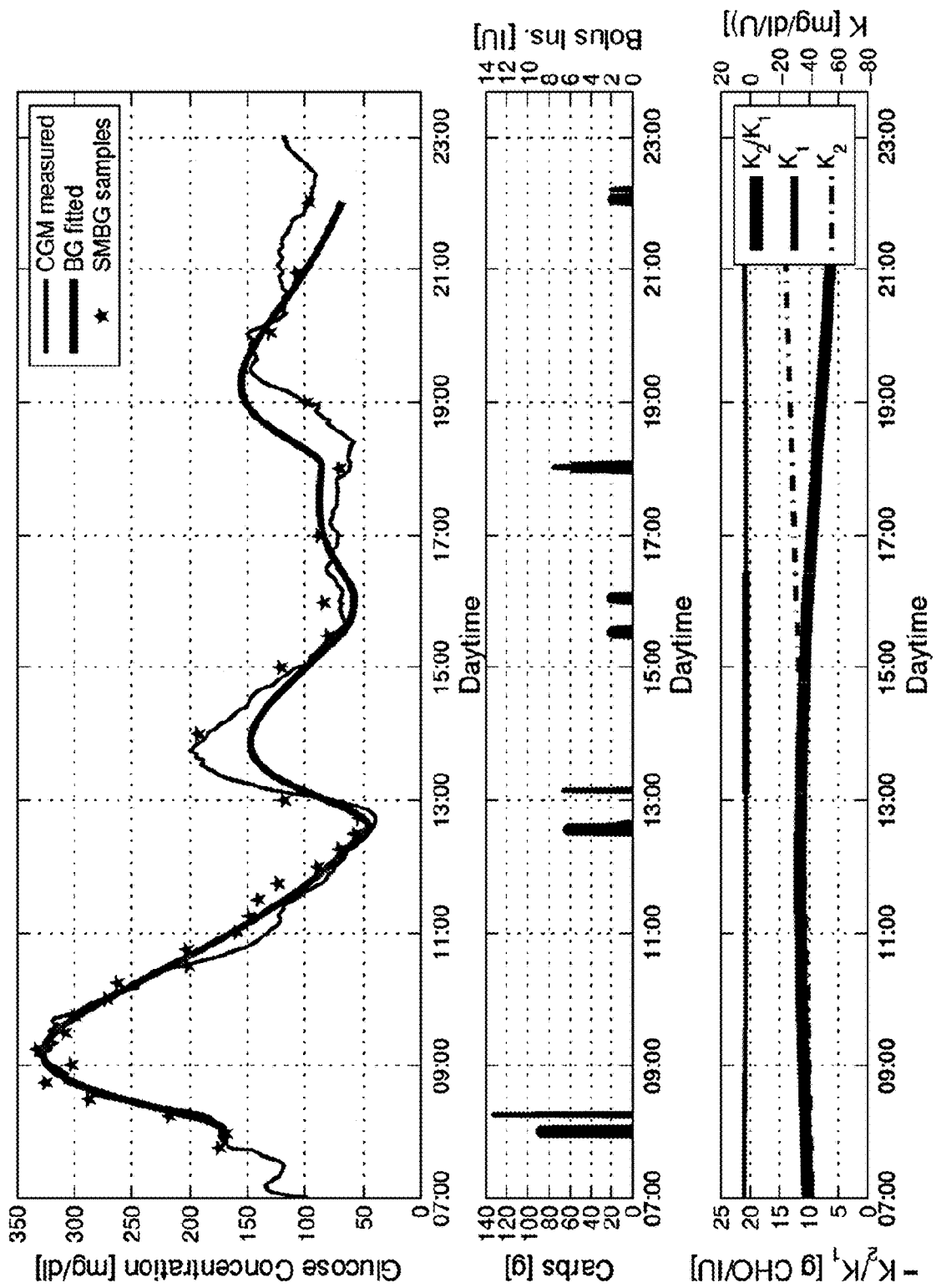
FIG. 2 is a graphic representation of measured glucose data and parameters identified from the model for the patient for day 3 and FIT=69,93%.
Figure 3:
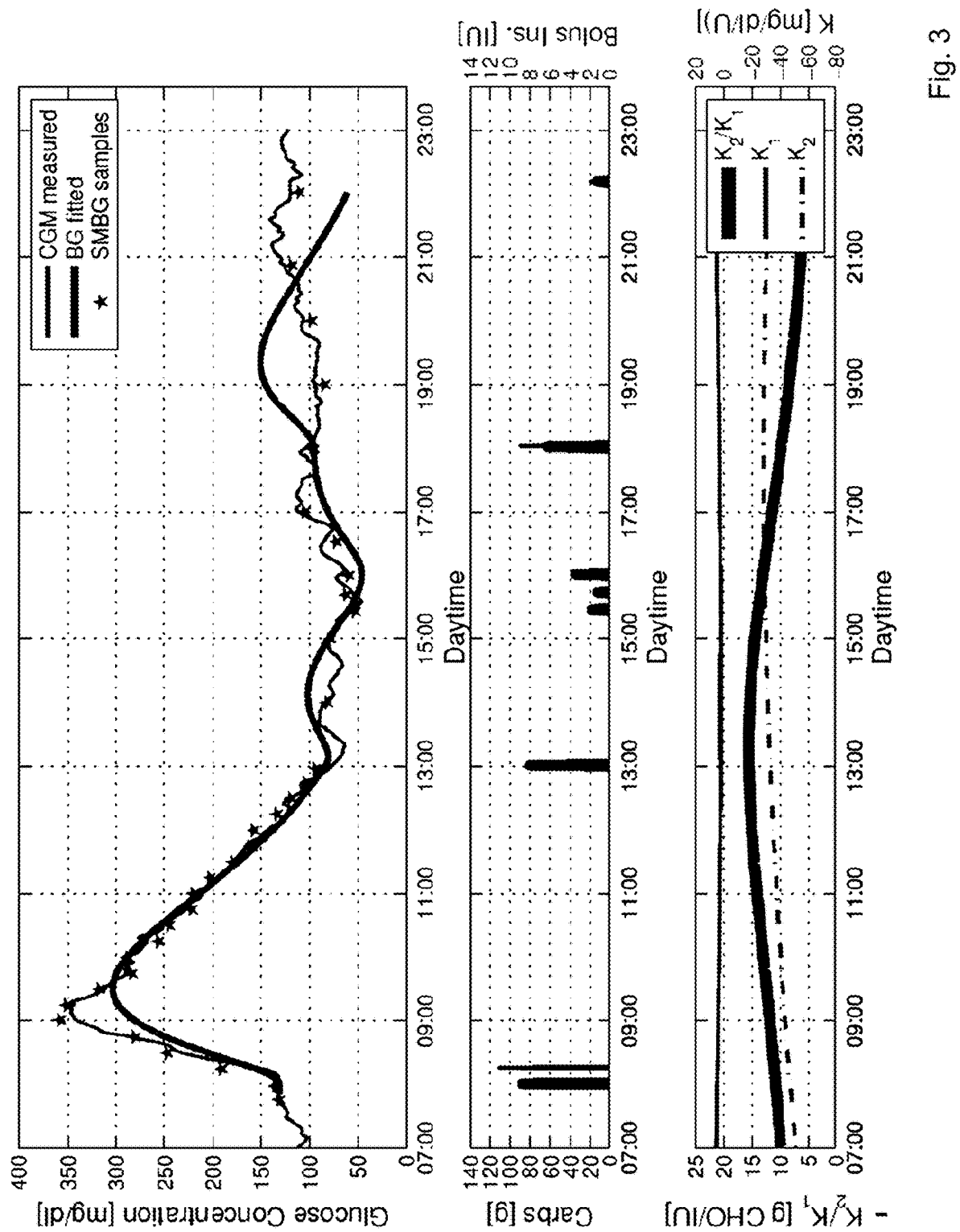
FIG. 3 is a graphic representation of measured glucose data and parameters identified from the model for the patient for day 4 and FIT=63,81%.
Figure 4:
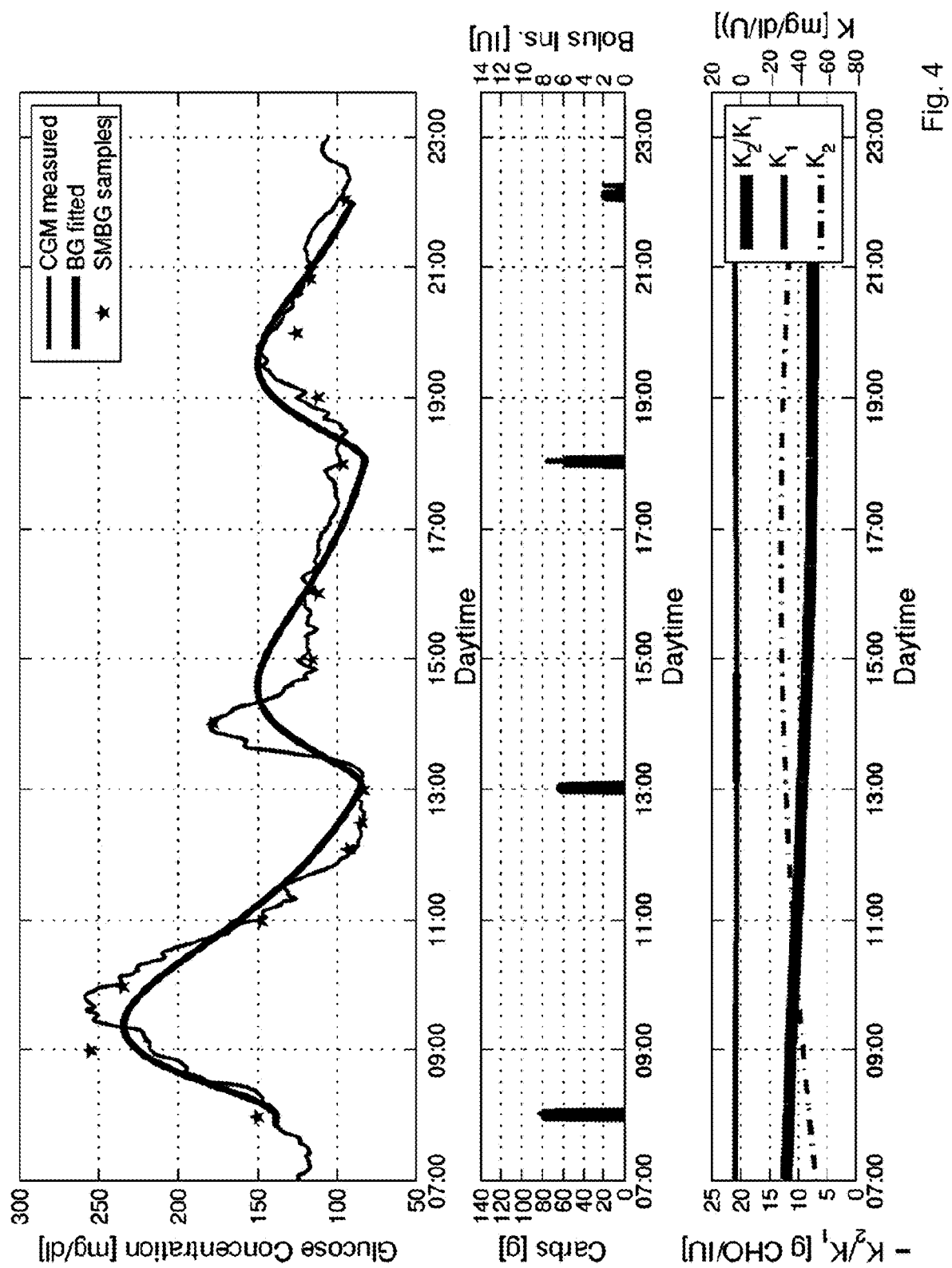
FIG. 4 is a graphic representation of measured glucose data and parameters identified from the model for the patient for day 5 and FIT=64,51%.
Figure 5:
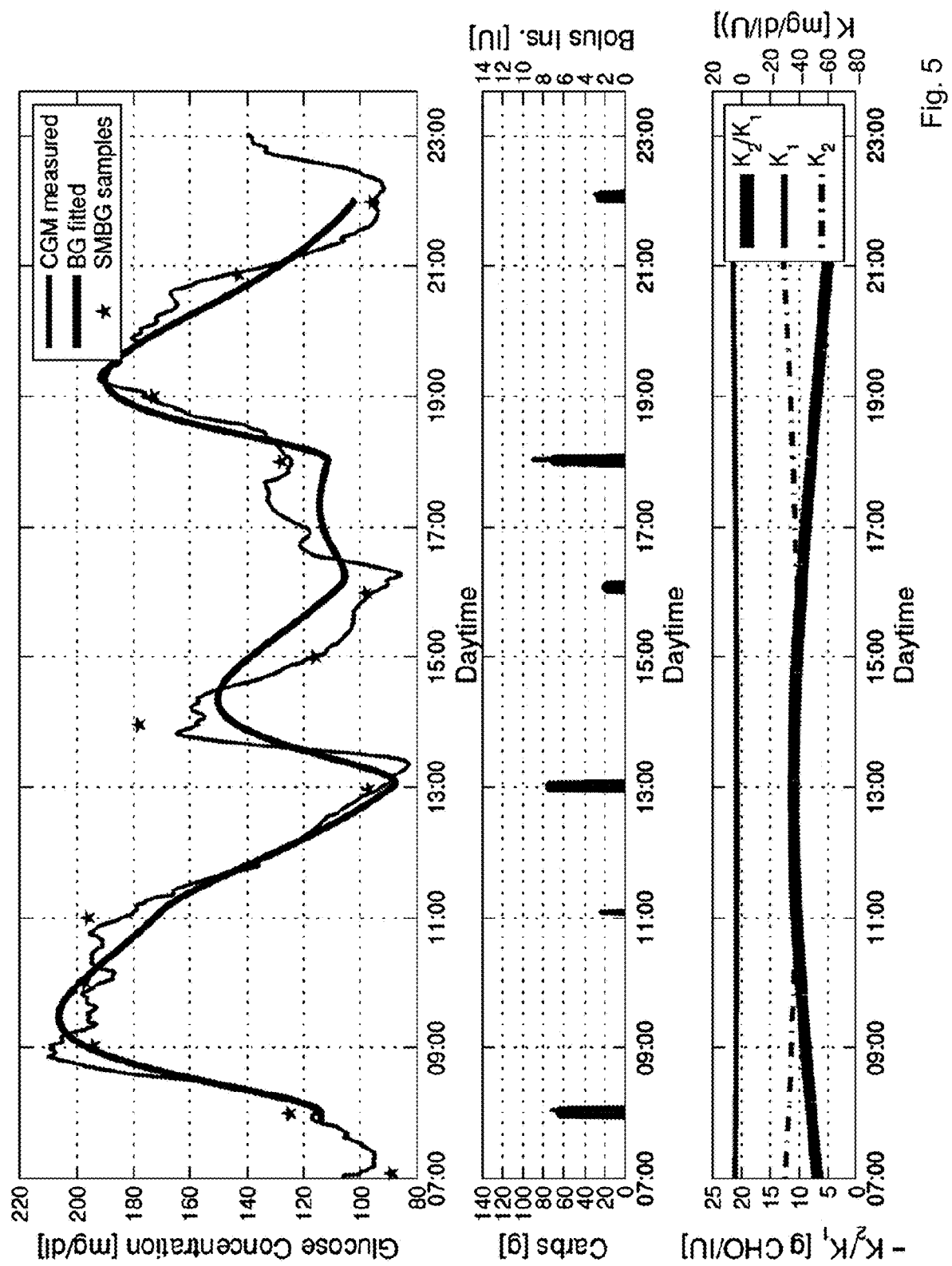
FIG. 5 is a graphic representation of measured glucose data and parameters identified from the model for the patient for day 6 and FIT=66,68%.
Figure 6:
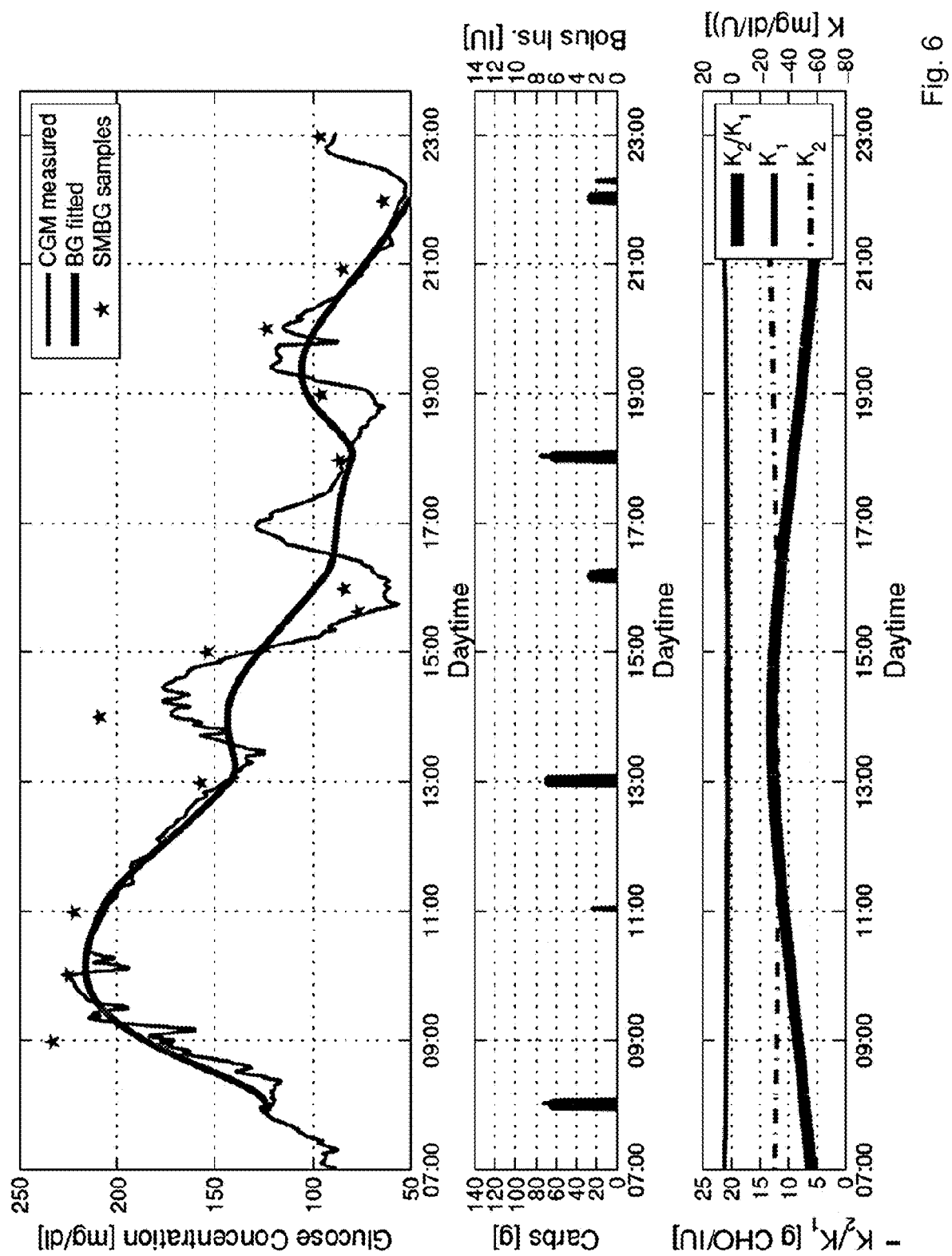
FIG. 6 is a graphic representation of measured glucose data and parameters identified from the model for the patient for day 7 and FIT=66,16%.

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

An essential aspect of insulin therapy in T1DM is to dose insulin in such a way that dangerous hypoglycemic episodes are avoided, but at the same time periods of prolonged hyperglycemia are also reduced as much as possible. The most common way of dosing insulin in T1DM is the so-called basal bolus therapy. Patients or generally referring users continuously supply their body with a small amount of insulin that is meant for keeping their BG (blood glucose) level more or less constant in the absence of larger disturbances. This amount of insulin is referred to as basal insulin and usually accounts for 30 to 60% of the total daily insulin requirements.

Patients on multiple daily injection (MDI) therapy, i.e., patients that use an insulin pen or syringe for dosing insulin, typically use one or two injections by day of long acting insulin for this basal purpose. After a couple of days at a constant injection scheme of basal insulin the concentration of the corresponding analogue in the blood stream is more or less constant and, as a result, the slow acting insulin is metabolized at more or less a constant rate.

Patients using an insulin pump (CSII therapy), on the other hand, use a rapid acting insulin analogue for supplying the required basal insulin which is infused according to a preprogrammed profile as a function of daytime. The profile of basal insulin as function of daytime is referred to as the basal rate. In an insulin pump the amount of basal insulin as a function of daytime can be adjusted much more precisely than using injections of slow acting insulin, and varied or even stopped depending on physiological needs such as stress or exercise.

In basal bolus therapy T1DM patients additionally have to supply their body with so-called insulin boluses. Whereas basal insulin is meant for keeping the BG more or less constant in the absence of major challenges, boluses are used to counteract the effect of those challenges on the BG level, as well as to correct the BG level in case it is found to be above the target zone (by injecting a so-called "correction bolus").

Meals can be a main challenge that lead to a fast increase in BG. The amount of required bolus insulin for a meal (the so-called "meal bolus") is usually assumed to be proportional to the amount of ingested carbohydrates. It is therefore crucial for the patient to estimate the carbohydrate content of meals which can be achieved through basic or advanced carbohydrate counting or based purely on a patient's experience and knowledge about his/her own habits. The essence of basic carbohydrate counting is for the patient to understand the relationship between meal intakes, physical activity and insulin injections on BG level in a qualitative sense.

People using basic carbohydrate counting are encouraged to ingest a consistent quantity of carbohydrates at similar times each day. The insulin dosing is then adjusted for such a "standard day."

In advanced carbohydrate counting (ACC) on the other hand the insulin dosing at meal times is adjusted individually for each meal based on its carbohydrate content. This offers more flexibility, but is associated with more effort for the patient. The estimated carbohydrate content of the meals is used in ACC together with patient-specific multiplication factors and information on the preprandial and desired postprandial BG level in order to determine the correct insulin bolus needs.

In ACC the carbohydrate content of the meal is estimated by the patient and a meal bolus insulin amount is injected that is directly proportional to the carbohydrate amount. Accurately determining the carbohydrate content of meals is difficult and needs a lot of experience. Besides an estimate of the carbohydrate content of the meal, a measurement of the actual preprandial BG level should also be available (usually determined with a BG meter). Using the carbohydrate estimate and the preprandial BG level, the required amount of bolus insulin can be determined using the following formula (Warshaw et al., American Diabetes Association, 2008; Walsh et al., 5.1. San Diego, CA: Torrey Pines Press, 2013.):

$$\text{Bolus} = \frac{CHO}{CIR} + \frac{BG_{pre} - BG_{target}}{ISF} - IOB \quad (1)$$

In formula (1) "Bolus" corresponds to the bolus insulin needs, CHO is the carbohydrate content of the meal in grams, $BG_{pre}$ is the preprandial BG, $BG_{target}$ describes the target value for the postprandial BG, and IOB stands for insulin-on-board. The formula for calculating the required bolus insulin amount comprises three terms:

The first formula expression or term in formula (1) is used for counteracting the effect of the meal intake on the BG. This term is usually significantly bigger than the other two terms. The proportionality factor CIR in this term is the so-called carbohydrate-to-insulin ratio, i.e., the amount of carbohydrates that are counteracted by 1 IU (insulin unit).

The second formula expression is used for BG corrections. The injected insulin amount from this term is proportional to the difference between $BG_{pre}$ and $BG_{target}$. The factor ISF, the insulin-sensitivity-factor, describes by how many mg/dl the BG level will decrease per injected 1 IU.

The third formula expression, IOB, stand for insulin-on-board, i.e., the bolus insulin from previous injections that is still active in the body.

Formula (1) can be used for calculating the required bolus insulin.

The third term of formula (1), IOB, is used to reduce the risk of overdosing insulin. Even fast-acting insulin needs several hours for its full action to have completed (typically around 5 to 6 hours). In order to determine IOB the PK/PD profile of for the injected insulin analogue has to be known. PK/PD profile refers to pharmacokinetic and pharmacodynamic (PK/PD) action profile for the most common insulins and insulin analogues available.

Automatic BCs may have an average insulin action curve saved. However, the time needed for the full action of bolus insulin, known as DIA, as to be entered into the automatic BC by the patient or MD (depending on type of insulin analogue, but also patient characteristics). The value of DIA is then used to scale the average insulin action curve. More information about DIA can be found in, for example, Walsh et al. (Journal of diabetes science and technology, vol. 8, no. 1, pp. 170-178, 2014.).

The factors or values of CIR and ISF can be adapted patient-specifically in order to allow for a good control of the BG level. Because of the huge effect of interpatient and intrapatient variability this is difficult. In order to obtain a first estimate often simple correlations are used that link CIR and ISF with easy to assess patient-specific quantities.

Data from Clinical Trials

For testing the methods described here data from two clinical trials, both conducted at the Institute of Diabetes Technology, Ulm, Germany, have been used. The detailed protocols of those two trials can be found in (Zschornack et al., Journal of diabetes science and technology, vol. 7, no. 4, pp. 815-823, 2013.) and (Freckmann et al., Journal of diabetes science and technology, vol. 7, no. 4, pp. 842-853, 2013.). The main goal of those trials was testing the measurement performance of CGM devices. The clinical protocols of both studies have been designed according to the recommendations from guideline POCT05-A (Clinical and Laboratory Standards Institute, CLSI document POCT05-A, Wayne, PA, 2008.).

Following, a methodology to compute estimates of the continuous glucose traces from CGM (Continuous Glucose Monitoring) and SMBG (Self-monitoring of blood glucose) data is disclosed. Additionally, the time delay between BG and the signal measured by the CGM is estimated in this methodology. The CGM time delays are analyzed with respect to their patient-specific component and correlations between the CGM time delays and other patient-specific quantities are searched for. Based on those findings a strategy is proposed for estimating the therapeutic settings for insulin therapy in T1DM based on identified CGM time delays.

Identification of CIR/ISF from Glucose Dynamics

As a basis for identifying CIR and ISF values from the measured glucose dynamics the following third order transfer function including an integrator term is chosen to model the response of the BG to carbohydrate intakes as well as to bolus insulin injections:

$$BG(s) = \frac{K_1}{(1+sT_1)^2 s} \cdot D(s) + \frac{K_2}{(1+sT_2)^2 s} \cdot U(s) \quad (2)$$

In this formula, BG(s) describes the BG level, D(s) the carbohydrates of meal intakes and U(s) the bolus insulin injections, all in the Laplace domain. Other influencing inputs like stress, sports, mixed meal composition etc. are not incorporated into this model structure. s refers to the complex Laplace frequency.

This model has been proposed and applied as such (see, for example, Kirchsteiger et al., in Proceedings of the 49th IEEE conference on decision and control (CDC), 2011, pp. 5176-5181; Kirchsteiger et al., International journal of control, vol. 87, no. 7, pp. 1454-1466, 2014.). The advantage of using model structure formula (2) is that the parameters of the model have a clear physiological meaning (see also Kirchsteiger et al., in Proceedings of the 2014 American control conference (acc), June 2014, pp. 5465-5470.). The constant $K_1$ describes the effect of 1 gram of carbohydrates on the BG, whereas $K_2$ predicts the effect of 1 IU of bolus insulin (both for t→∞). The time constants T1 and T2 are proportional to the response time of the BG to carbohydrate and insulin inputs. Interestingly, the constant-$K_2$ has the same physiological meaning as the factor ISF in the BC formula (1). Furthermore, the physiological interpretation of the mixed constant $(-K_2/K_1)$ is identical to that of the CIR. As implicitly assumed by using the BC formula (1) for calculating the bolus insulin needs, carbohydrate and insulin inputs have a persistent effect on the BG in the model structure (2), which is caused by the fact that both transfer functions contain an integrator term (pole at s=0). In this model structure only bolus insulin is treated as an input and has therefore an effect on the glucose dynamics. Basal insulin is assumed to be well adjusted and would therefore keep the BG at a constant level in the absence of challenges to the glucose metabolism.

Using such gray box model structures for identifying CIR and ISF values is known. The first attempt for doing so is reported in (Percival et al., Journal of diabetes science and technology, vol. 4, no. 5, pp. 1214-1228, 2010), however, with only limited success. The model structure (formula (2)) was first reported in (Kirchsteiger et al., in Proceedings of the 18th IFAC world congress, Milano, Italy, August 2011, pp. 11 761-11 766.) as a tool for identifying interval models. The same structure is then used in an in silico study for the identification of CIR values by fitting the model to data (Kirchsteiger et al., International journal of control, vol. 87, no. 7, pp. 1454-1466, 2014). These CIR values are then subsequently used (successfully) for glucose control. However, the model proposed was only able to describe the glucose dynamics after a single meal challenge (around 5 hours of data).

Assuming constant, patient-specific factors for CIR and ISF is a simplification. The amount of insulin that has to be injected per gram of CHO is in reality influenced by a myriad of different variables such as the time of the day, levels of physical activity, and psychological and physical stress.

In the present disclosure the model represented by formula (2) is used, and time dependent terms are added in order to allow for diurnal variations in the model parameters. Using CGM data from clinical study together with recorded data about carbohydrate intakes and insulin injections, the model parameters were identified. Contrary to the methods in the art (Kirchsteiger et al., in Proceedings of the 49th IEEE conference on decision and control (CDC), 2011, pp. 5176-5181; Kirchsteiger et al., International journal of control, vol. 87, no. 7, pp. 1454-1466, 2014) no methods from direct continuous time system identification were employed, but the parameters were determined by directly minimizing the quadratic error between the analytical expression for the model output in the time domain and the measured CGM data.

The model structure (2) is used as a basis for identifying diurnal patterns in insulin action. This model structure uses the meal carbohydrates Ds) and bolus insulin injections U(s) as only system inputs. The carbohydrate intakes d(t) and the insulin injections u(t) are represented by impulses in the time domain (with $\delta(t)$ being the Dirac delta function, K the total number of carbohydrates intakes in the relevant time frame, $A_i$ the mass of carbohydrates in grams of each meal intake i, L the total number of insulin injections in the relevant time frame, $B_j$ the amount of bolus insulin in IU of each injection j and $t_i$ and $t_j$ the corresponding times of the carbohydrate intakes and insulin injections):

$$d(t) = \sum_{i=1}^{K} A_i \cdot \delta(t - t_i) \quad (3a)$$

$$u(t) = \sum_{j=1}^{L} B_j \cdot \delta(t - t_j) \quad (3b)$$

In previous studies (see, e.g., Reiterer et al., in Prediction methods for blood glucose concentration: Design, use and evaluation, Kirchsteiger, Jørgensen, Renard, and del Re, Eds., Springer International Publishing Switzerland, 2016, pp. 57-78) the parameters $K_1$, $T_1$, $K_2$ and $T_2$ of formula (2) have been chosen to be constant and have been adjusted in a way to achieve an optimal alignment between recorded CGM data and the BG values as predicted by the model. Choosing constant values for insulin and carbohydrate sensitivity for the entire day is basically incorrect because these sensitivities aren't constant factors, but change significantly depending on the time of the day and on other influencing factors (physical activity, insulin injections site, etc.). It is generally agreed upon that the measured insulin sensitivity in the morning is lower than in the evening for people with diabetes. Assuming constant values for the entire day period means that the identified parameters correspond to averages over the entire day period.

In order to accommodate for such diurnal variations the model structure (2) has been modified to model the effect of the daytime on insulin and carbohydrate sensitivity. In the current section the factors $K_1$ and $K_2$ are no longer assumed to be constant, but for each meal intake and insulin injection a specific value is calculated. However, the factors are assumed to change slowly and smoothly over time, therefore they were chosen to be described by a second-order polynomial of daytime:

$$K_{1,i} = K_{11} + K_{12} \cdot t_i + K_{13} \cdot t_i^2 \quad (4a)$$

$$K_{2,j} = K_{21} + K_{22} \cdot t_j + K_{23} \cdot t_j^2 \quad (4b)$$

As can be seen in (4a) and (4b), for each input a separate value of $K_1$ and $K_2$ is calculated using the time of the corresponding carbohydrate intake ($t_i$) and insulin injection ($t_j$). The values are then kept constant for calculating the system response following a specific input. It should be noted that the time of carbohydrate intakes and insulin injections can be identical, but often it is slightly shifted in time. Furthermore, there are also insulin inputs that are not linked with meals, for example correction boluses, and carbohydrates intakes that are not linked with a bolus, e.g., when carbohydrates are taken for treating or preventing hypoglycemia.

Assuming quadratic functions for both, $K_1$ and $K_2$, proved to be a good compromise between keeping the simplicity of the model and having a good performance at fitting the data. Doing so increases the number of unknown parameters for the system identification problem from 4 as in the original model ($K_1$, $K_2$, $T_1$ and $T_2$) to 8 ($\theta = [K_{11}, K_{12}, K_{13}, K_{21}, K_{22}, K_{23}, T_1, T_2]^T$).

A method was described how the parameters of the model (2) could be identified using methods from continuous time system identification (Kirchsteiger et al., International journal of control, vol. 87, no. 7, pp. 1454-1466, 2014).

For the present disclosure no methods from direct continuous time system identification were chosen to identify the model parameters. Instead, it was taken advantage of the fact that the model (2) itself (together with (4a) and (4a)) as well as the inputs (3a) and (3b) are described by relatively simple functions. Therefore, it is possible to perform the inverse Laplace transformation for (2) and obtain an analytical expression for the convolutions integral that describes the BG response to carbohydrate intakes and insulin injections. The model in the time domain is therefore described by (5).

$$BG(t) = BG_0 + \sum_{i=1}^{K} A_i (K_{11} + K_{12} t_i + K_{13} t_i^2) \left(1 - \exp\left(-\frac{t-t_i}{T_1}\right)\left(1 + \frac{t-t_i}{T_1}\right)\right) \mathcal{H}(t-t_i) + \sum_{j=1}^{L} B_j (K_{21} + K_{22} t_j + K_{23} t_j^2) \left(1 - \exp\left(-\frac{t-t_j}{T_2}\right)\left(1 + \frac{t-t_j}{T_2}\right)\right) \mathcal{H}(t-t_j) \quad (5)$$

In this formula $BG_0$ corresponds to the initial BG concentration, t is the time (in min, with t=0 min at the start of the identification time frame) and H is the Heaviside function. To derive the structure (5) it is assumed that the BG is in equilibrium at the start of an identification time frame. In the current work these time frames were defined to start just before breakfast (around 8:00) and ended at 22:00 of the same day. So, one identification time frame included breakfast, lunch and dinner of the corresponding day. This is different from what was done in the prior art (Kirchsteiger et al., International journal of control, vol. 87, no. 7, pp. 1454-1466, 2014) where only data from breakfasts were used in the system identification.

To identify the parameters of the model, the analytical expression of BG dynamics was used directly. The system identification therefore consisted of trying to find the optimum set of parameters that minimizes the quadratic error between the calculated BG as described by (5) and the measured values. For each patient the parameters θ of one identification time frame were assumed to be constant. However, in order to limit the intrapatient variability of the model parameters it proved to be crucial to limit the variability of the time constants $T_1$ and $T_2$. Therefore, the parameters for all days were determined in one go and the deviation of $T_1$ and $T_2$ from the mean value for all days was limited to a maximum allowed value by using additional constraints in the optimization. Furthermore, in order to limit the search for optimum parameters to a physiologically relevant parameter space, minimum and maximum values for the model parameters have been defined. The whole optimization problem therefore reads as stated in (6).

$$(K_{1k,l}^*, K_{2k,l}^*, T_{1,l}^*, T_{2,l}^*) = \underset{K_{1k,l}, K_{2k,l}, T_{1,l}, T_{2,l}}{\operatorname{argmin}} (\underline{BG}_{model} - \underline{BG}_{meas})^\top \cdot (\underline{BG}_{model} - \underline{BG}_{meas}) \quad (6)$$

subject to: $K_{1,min} < K_{11,l} + K_{12,l} \cdot t + K_{13,l} \cdot t^2 < K_{1,max}$ for $t \in [t_{min}, t_{max}]$ $K_{2,min} < K_{21,l} + K_{22,l} \cdot t + K_{23,l} \cdot t^2 < K_{2,max}$ for $t \in [t_{min}, t_{max}]$ $CIR_{min} < \dfrac{K_{21,l} + K_{22,l} \cdot t + K_{23,l} \cdot t^2}{K_{11,l} + K_{12,l} \cdot t + K_{13,l} \cdot t^2} < CIR_{max}$ for $t \in [t_{min}, t_{max}]$ $1 - \Delta_K < \dfrac{K_{11,l} + K_{12,l} \cdot t + K_{13,l} \cdot t^2}{\frac{1}{N}\sum_{m=1}^{N}(K_{11,m} + K_{12,m} \cdot t + K_{13,m} \cdot t^2)} < 1 + \Delta_K$ for $t \in [t_{min}, t_{max}]$ $1 - \Delta_K < \dfrac{K_{21,l} + K_{22,l} \cdot t + K_{23,l} \cdot t^2}{\frac{1}{N}\sum_{m=1}^{N}(K_{21,m} + K_{22,m} \cdot t + K_{23,m} \cdot t^2)} < 1 + \Delta_K$ for $t \in [t_{min}, t_{max}]$ $1 - \Delta_{ISF} < \dfrac{K_{21,l} + K_{22,l} \cdot t + K_{23,l} \cdot t^2}{-ISF_{King}} < 1 + \Delta_{ISF}$ for $t \in [t_{min}, t_{max}]$ $T_{1,min} < T_{1,l} < T_{1,max}; T_{2,min} < T_{2,l} < T_{2,max};$ $T_{21,min} < \dfrac{T_{2,l}}{T_{1,l}} < T_{21,max}$ $1 - \Delta_T < \dfrac{T_{1,l}}{\frac{1}{N}\sum_{m=1}^{N} T_{1,m}} < 1 + \Delta_T; 1 - \Delta_T < \dfrac{T_{2,l}}{\frac{1}{N}\sum_{m=1}^{N} T_{2,m}} < 1 + \Delta_T$ with: $k = 1, 2, 3\ l = 1, 2, \ldots, N$ In this optimization problem $BG_{meas}$ is the vector of measured glucose values, whereas $BG_{model}$ corresponds to a vector of values calculated using equation (5) evaluated at the time points of the measurements, so the cost function is the sum of quadratic errors between measured and calculated values. The model output in vector $BG_{model}$ depends of course on the values of the model parameters $K_{1k,l}$, $K_{2k,l}$, $T_{1,l}$ and $T_{2,l}$ with indexes k (index to describe the three parameters in the quadratic equations for $K_1$ and $K_2$) and l (index describing each separate time frame for the system identification, N time frames in total).

As already mentioned, minimum and maximum values are given for $K_1$, $K_2$, $K_2/K_1$, $T_1$ and $T_2$ in order to restrict the parameter space to a physiologically meaningful region. For $K_1$ and $K_2$ it has to be assured that the quadratic equations (4a) and (4b) stay within the search interval defined by minimum and maximum value for $K_1$ and $K_2$. This is done by imposing the first two inequalities of (6) for specific time points within each identification time frame (defined by the corresponding $t_{min}$ and $t_{max}$). For the current work, these inequalities are imposed at equidistant time points separated by intervals of one hour. The same procedure was done in order to impose that $K_2/K_1$ should lie within a physiologically meaningful range (defined by $CIR_{min}$ and $CIR_{max}$). A compilation of the minimum and maximum values used in the system identification can be found in Table 1.

Additionally, a restriction was put in order to limit the intrapatient variability of $T_1$ and $T_2$. An inequality constraint limits the maximum deviation from the corresponding mean value (average for all N days) to ΔT. For the current work a maximum deviation of 25% was used for both, $T_1$ and $T_2$ ($\Delta_T=0.25$). This additional restriction proved to be necessary in order to be able to identify patient-specific diurnal profiles for $K_2/K_1$. Furthermore, the resulting patterns of $K_2/K_1$ showed a much better resemblance with the diurnal variations of factor CIR used during the clinical trial for calculating the insulin bolus needs.

Furthermore, constraints have been introduced in order to limit the intrapatient variability of the profiles of $K_1$ and $K_2$ to a reasonable value. The day-to-day variations of the profiles of $K_1$ and $K_2$ were limited to 30% ($\Delta_K$=0.30) which were assumed to be reasonable values (see, e.g., Heinemann, Diabetes technology & therapeutics, vol. 4, no. 5, pp. 673-682, 2002.) for the intrapatient variability of insulin absorption and insulin action).

The values of $K_2$ were furthermore imposed not to vary too much from some predefined reference ISF values.

In an example, the day-to-day variability of $T_1$ and $T_2$ was restricted to 25% ($\Delta_T$=0.25) and the day-to-day variations of the profiles of $K_1$ and $K_2$ were limited to 30% ($\Delta_K$=0.30) which were assumed to be reasonable values (see, e.g., Heinemann, Diabetes technology & therapeutics, vol. 4, no. 5, pp. 673-682, 2002) for the intrapatient variability of insulin absorption and insulin action).

By simply rearranging terms, the inequality constraints in (6) can be rewritten in the form $A \cdot \theta < b$ (where $\theta$ corresponds to the parameter vector containing the unknown model parameters), which means that the problem boils down to a (non-convex) optimization problem subject to linear inequalities. Therefore, this optimization problem can be solved using most standard optimization tools. The MATLAB routine FMINCON was used to identify values for the parameters.

Results

The method outlined above has been applied to the clinical data from trial (Zschornack et al., Journal of diabetes science and technology, vol. 7, no. 4, pp. 815-823, 2013). For each day the data from the CGM device with the lowest MARD for that specific day was chosen. However, the SMBG could have also been used for the system identification without any modifications to the methodology, but the SMBG data, of course, have a much coarser time resolution. For simplicity it is assumed that the CGM devices used in this trial are perfectly calibrated and read the transient values of the BG without any additional time delays. This assumption is a simplification that has been made throughout this thesis. However, seeing that the measurement performance of the CGM system used in the trial is very high (MARD less than 10%) and the time delay of the specific CGM device is very short, this assumption seems to be justified for the dataset used in this work. Alternatively, a post-processing of the CGM signals together with the SMBG could be performed in order to account for the loss of calibration of the CGM as well as for delay times between BG and interstitial glucose.

The system identification has been performed for the entire database of patients and using the procedure outlined above. As a result, reasonable fits could be obtained for all patients and almost all days of the clinical trial. In order to assess the quality of the identified models the FIT value was used ($\hat{y}_i$: model output, $y_i$: measurement, $\bar{y}$: mean over measurements, $N_{tot}$: total number of measurements):

$$FIT = 100 \left( 1 - \sqrt{\frac{\sum_{i=1}^{N_{tot}} (\hat{y}_i - y_i)^2}{\sum_{i=1}^{N_{tot}} (y_i - \bar{y})^2}} \right) \quad (7)$$

TABLE 1

|  | Minimum | Maximum |
|---|---|---|
| $K_1$ [mg/dl/g CHO] | 2 | 8 |
| $K_2$ [mg/dl/IU] | −100 | −10 |
| $-K_2/K_1$ [g CHO/IU] | 2 | 100 |
| $T_1$ [min] | 10 | 60 |
| $T_2$ [min] | 25 | 150 |
| $T_2/T_1$ [—] | 1 | 10 |
| Timeframe for identification | 7:50 | 22:00 |

After a careful analysis of the results of the system identification, it was assumed that the general BG dynamics could be described reasonably well for the case of FIT values higher than 40% (engineering judgement). Therefore, 40% was used as a threshold to distinguish between good and bad descriptions of the BG dynamics and only models with a FIT value higher than this threshold value were considered in the further analyses. It should be noted that sensitivity calculations with different FIT limit values (even as low as 10%) led to very similar results when comparing the computed values of $K_2/K_1$ with the clinically used CIRs (discussed later in this section), which shows the robustness of the method. In 75% of the cases a model with a FIT value higher than the threshold could be identified using the methodology outlined above. For the 25% of cases with a FIT value below the threshold, the poor description of BG dynamics is most likely due to the strong impact of some unmodeled disturbances (e.g., physical or psychological stress).

An example for the identified model for one specific patient (patient 0013) and all complete days of the trial (days 2 to 7) can be seen in FIGS. 1 to 6.

The first panel of each figure displays the CGM (as well as the SMBG) data from the clinical trial together with the glucose dynamics as described by the fitted model. For this case a reasonable agreement between the measurements and the model output could be achieved for all days (FIT values between 63.81% and 69.93%). In the second panel the carbohydrate intakes and insulin injections as recorded during the trial can be seen. These were used as inputs for the model. The third panel shows the evolution of $K_1$ and $K_2$ as described by equations (4a) and (4b) with the values of the identified model parameters as well as the diurnal changes of the resulting $K_2/K_1$. It should be noted that $K_1$ is positive, whereas $K_2$ is negative, and that the numerical values of $K_1$ are by about one order of magnitude smaller than $K_2$.

Combining the evolution for $K_2/K_1$ versus daytime for several days in one plot, a representation can be generated with interesting patient-specific information. Comparing the diurnal changes for several days, it is possible to draw conclusions about whether or not a patient has a characteristic profile for $K_2/K_1$ that looks more or less the same for all days or whether there are bigger changes in shape from one day to another. Furthermore, the distance between the curves can be used as a measure for the intrapatient variability of insulin action. These kinds of features could be used to classify patients into different groups for which it might be best to search for a dedicated strategy for managing BG.

Figure 7:
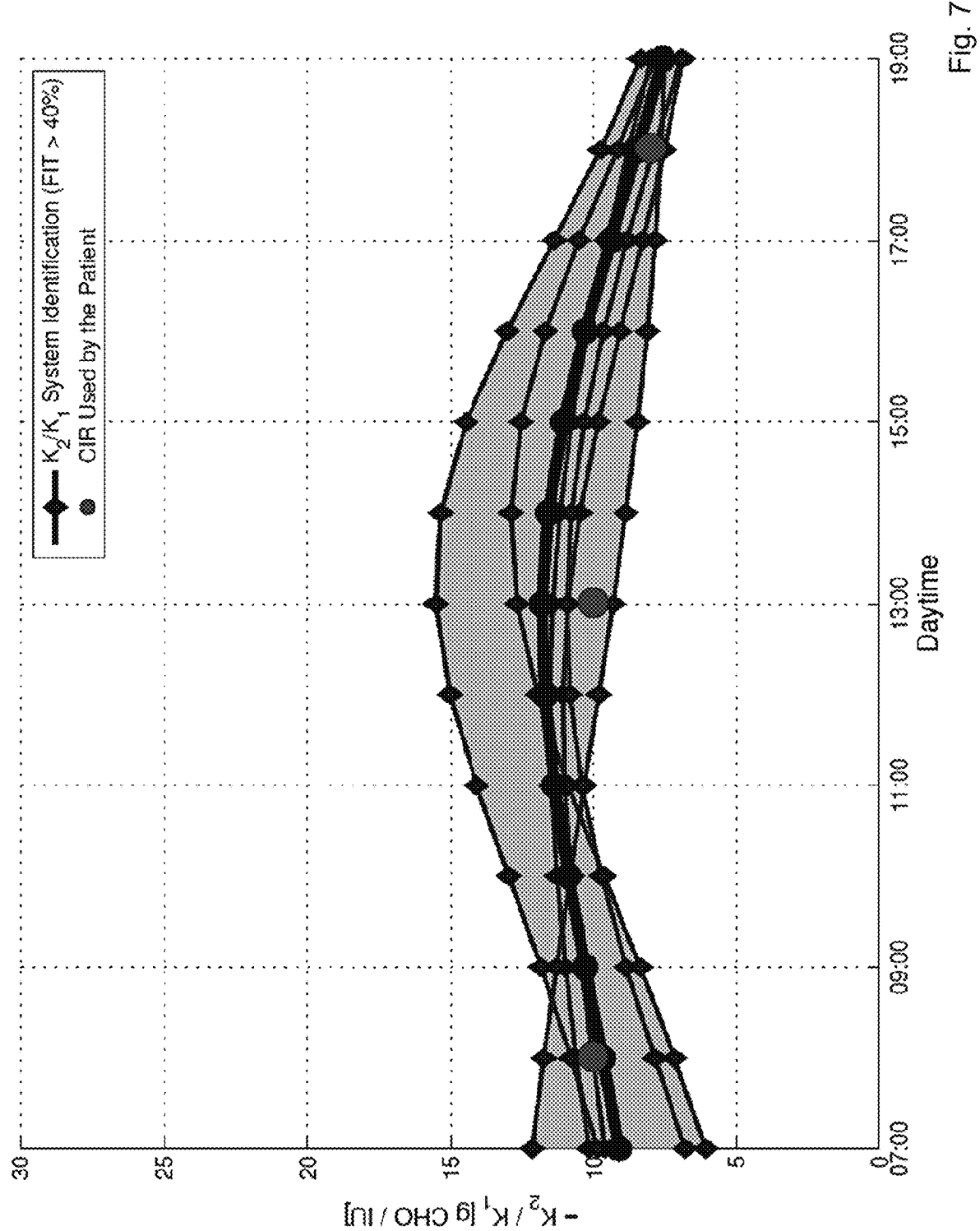
FIG. 7 is a graphical representation for a comparison of identified profiles of $K_2/K_1$ and clinical used CIR values for the patient.
Figure 9:
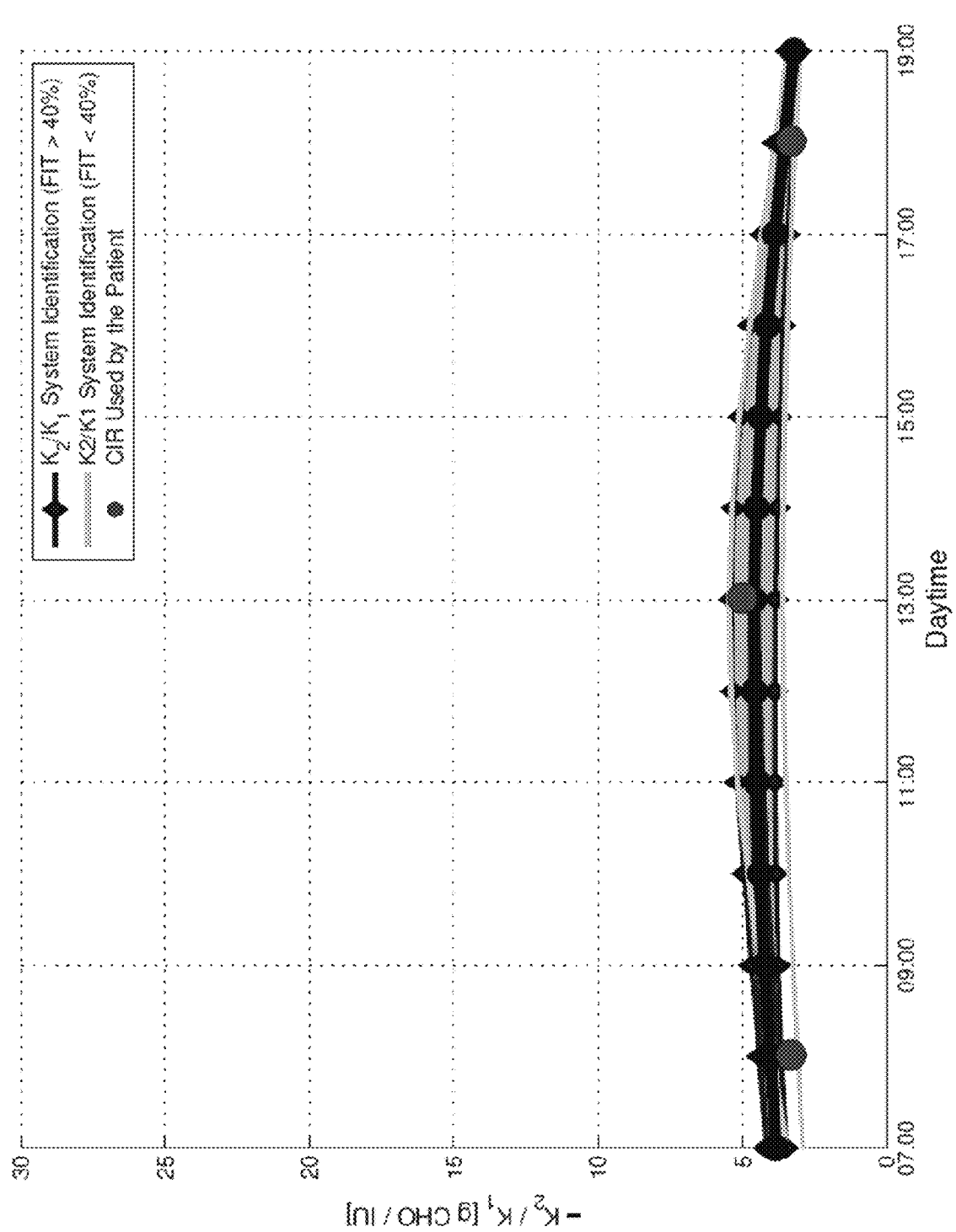
FIG. 9 is a graphical representation for a comparison of $K_2/K_1$ and clinical used CIR values for another patient (patient 0033)
Figure 10:
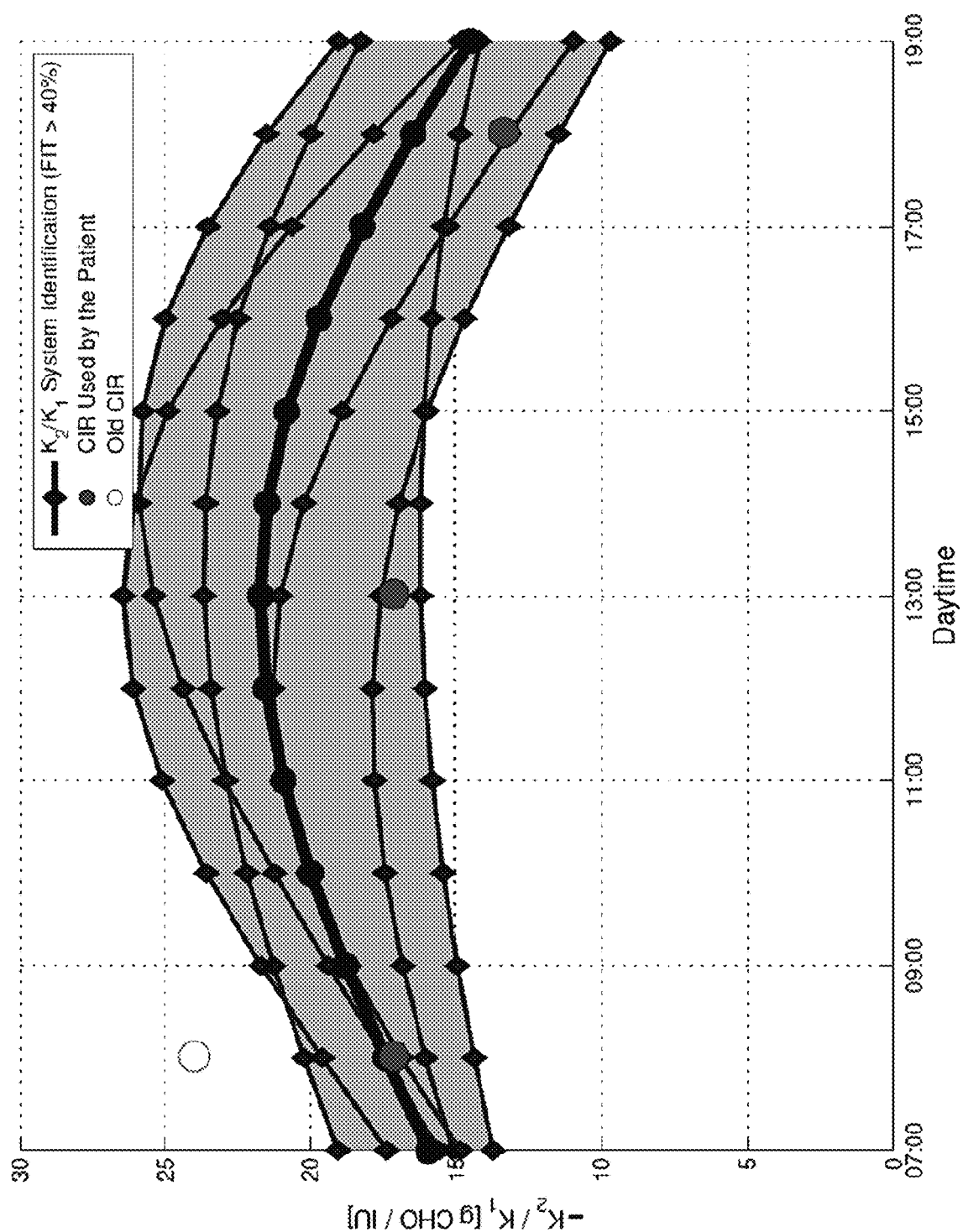
FIG. 10 is a graphical representation for a comparison of $K_2/K_1$ and clinical used CIR values for still another patient (patient 0051)

Examples for such a type of plot for three different patients (0013, 0033 and 0051) can be seen in FIGS. 7, 9 and 10. In these plots the diurnal profiles of $K_2/K_1$ of each day of data are shown in blue (for FIT≥40%) or green (for FIT<40%), whereas the average profile corresponds to a bold black line. For patient 0033 (FIG. 9) it was, e.g., found that the typical pattern for $K_2/K_1$ is relatively stable as a function of daytime (with a slight maximum around lunchtime) and shows a moderate degree of intrapatient variability which seems to be the highest around the middle of the day.

However, a typical shape could not be identified for all patients. An example for a patient with a more pronounced day-to-day variability of profiles can be seen in FIG. 7 for patient 0013. For that patient four curves have a maximum of $K_2/K_1$ close to lunchtime whereas one curve decreases monotonically from breakfast to dinner. Patient 0051 from FIG. 10 on the other hand shows a consistent shape of the $K_2/K_1$ profiles, but a large distance between the curves for each day, indicating a high level of intrapatient variability.

Figure 8:
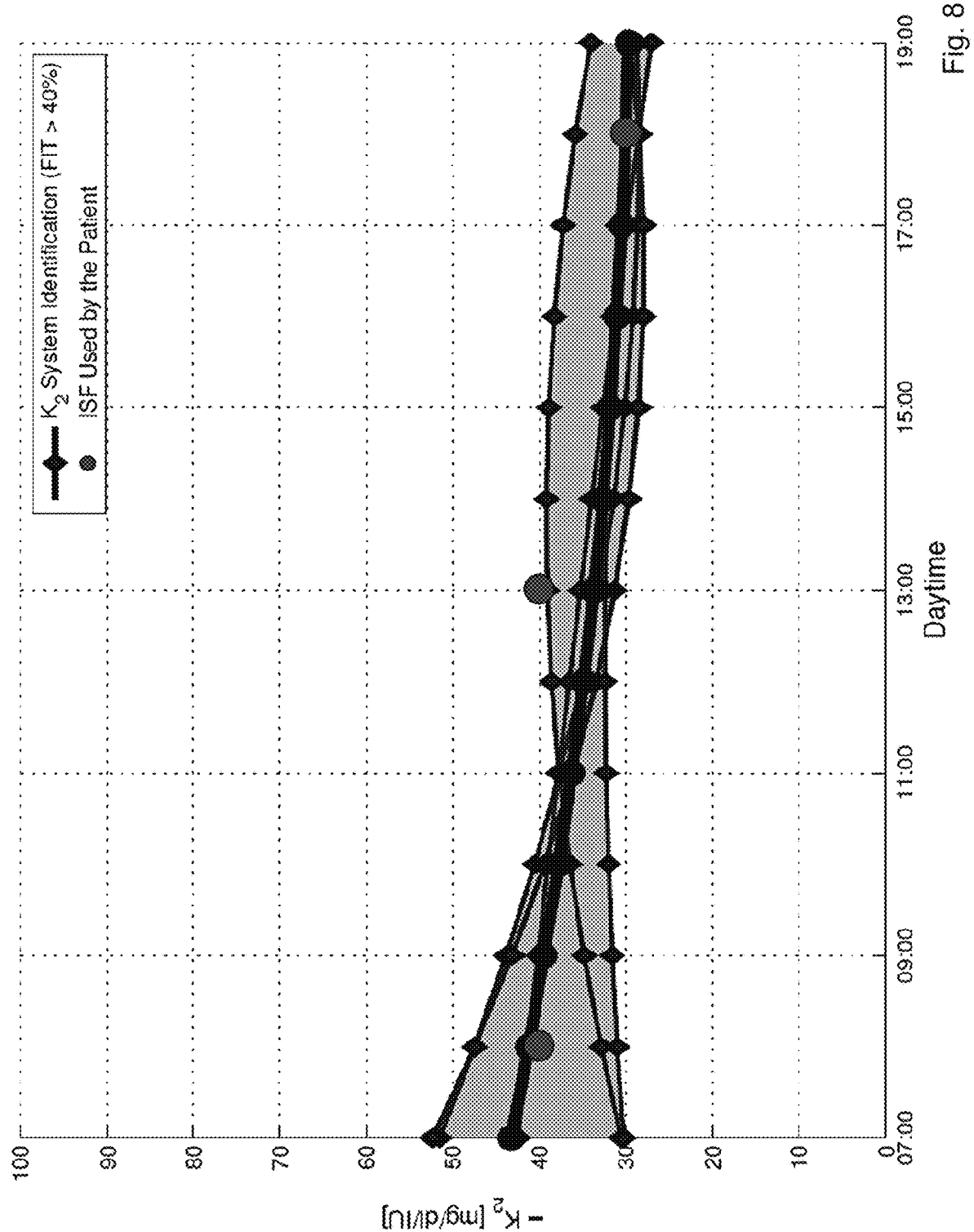
FIG. 8 is a graphical representation for comparison of identified profiles of $K_2$ and clinical used ISF values for the patient.

Besides the information about the intrapatient variability of $K_2/K_1$ and the day-to-day consistency of the relative shapes, the $K_2/K_1$ curves from the system identification can also be compared with the CIRs that were used by the patients in the trial to calculate the bolus insulin needs. The same can of course also be done for the $K_2$ profiles (see FIG. 8 for such an example) that can be compared with the clinically used ISF values. The clinically used CIR and ISF factors are already included in FIGS. 7 to 10 as red circles. In case these values have been changed during the course of the clinical trial, the old values are still included in the plots as white circles. In the clinical trial dedicated values for CIR have been used for breakfast, lunch and dinner. It can be seen from the four illustrative figures that there is a rather good agreement between the identified curves and the clinically used factors. Only for the case depicted in FIG. 10, where there are strong day-to-day variations for the curves of $K_2/K_1$, the distance between the average diurnal profile (bold black line) and the clinically used CIRs is a bit bigger.

Figure 11A:
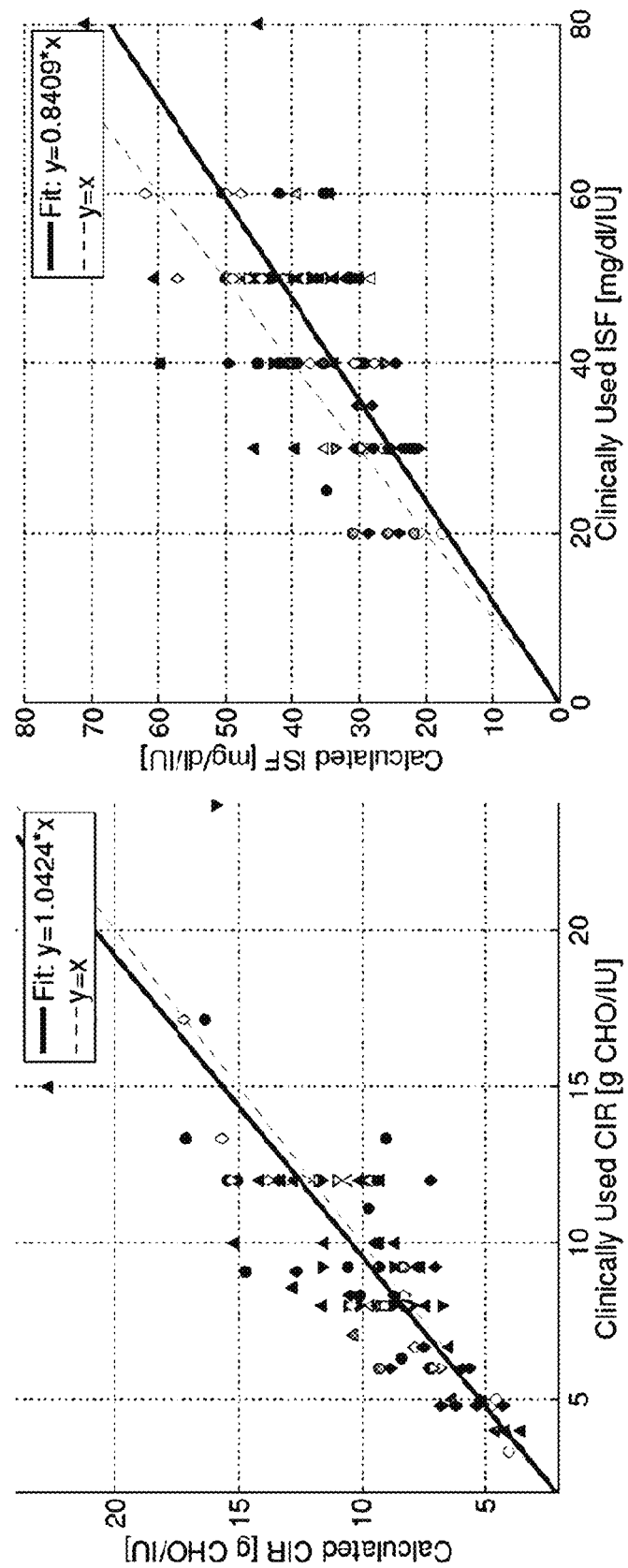
FIG. 11a is a graphical representation for a comparison of calculated vs. clinical used CIR (left) and ISF (right) values (all meals combined)
Figure 11B:
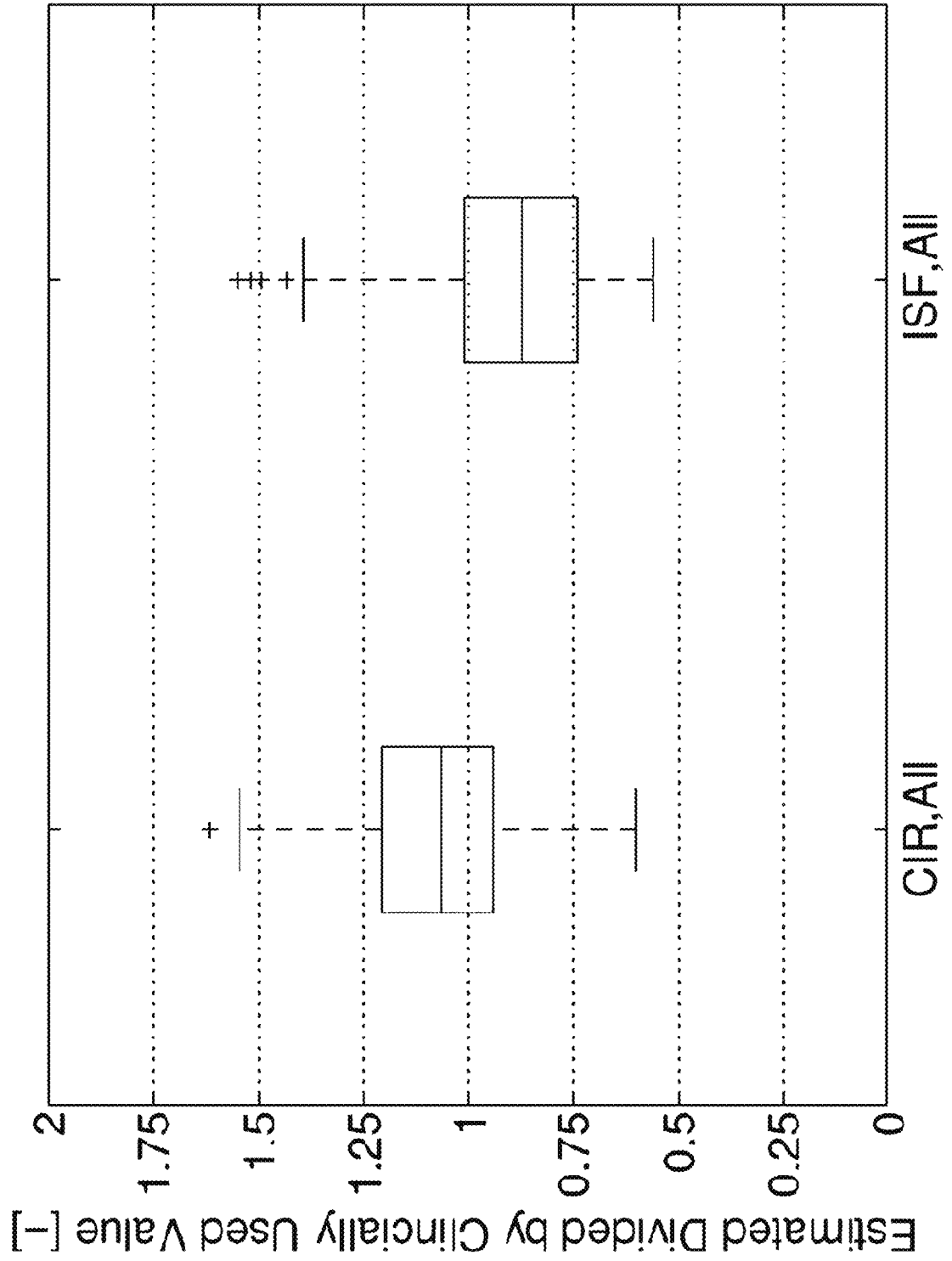
FIG. 11b is a graphical representation for a comparison (boxplots) of calculated divided by clinical used CIR and ISF values (all meals combined)

A comparison of $K_2/K_1$ with the corresponding values of CIR for all patients and all days has been performed and the good correlation between $K_2/K_1$ and CIR could be confirmed. The same also holds for $K_2$ and the clinically used ISF values. This comparison can be seen in FIGS. 11a and 11b. Calculating the ratio of the two values $((-K_2/K_1)_{Calculated}/CIR_{Clinical}$ and $(-K_2)_{Calculated}/ISF_{Clinical})$ for all patient, all meals and all days of the trial results in a distribution with median 1.06, 25% quartile 0.94 and 75% quartile 1.21 for CIR and with median 0.87, 25% quartile 0.74 and 75% quartile 1.01 for ISF (see FIG. 11b and Table 2 below).

TABLE 2

|  | 25% Quant. | 50% Quant. | 75% Quant. | Minimum | Maximum |
| --- | --- | --- | --- | --- | --- |
| CIR | 0.941 | 1.064 | 1.208 | 0.601 | 1.619 |
| ISF | 0.740 | 0.872 | 1.008 | 0.563 | 1.551 |

It can be seen that for the ISF values a systematic negative bias exists (the clinically used ISF values are larger than the ones identified from data). This might be an intentional overestimation in the clinically used ISF values in order to avoid hypoglycemia after correction boluses. For the CIR values no significant bias between calculated and clinically used values was found.

Figure 12:
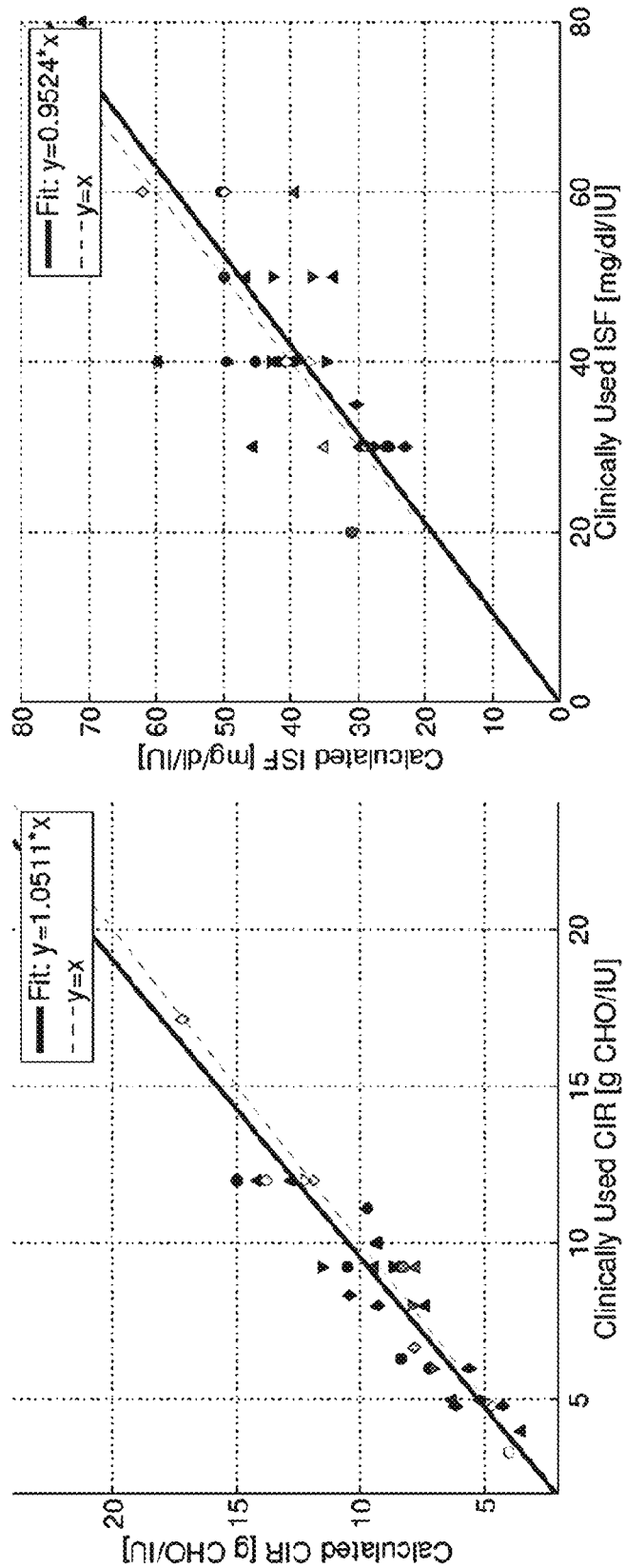
FIG. 12 is a graphical representation for a comparison of calculated and clinical used CIR and ISF values for breakfast.
Figure 13:
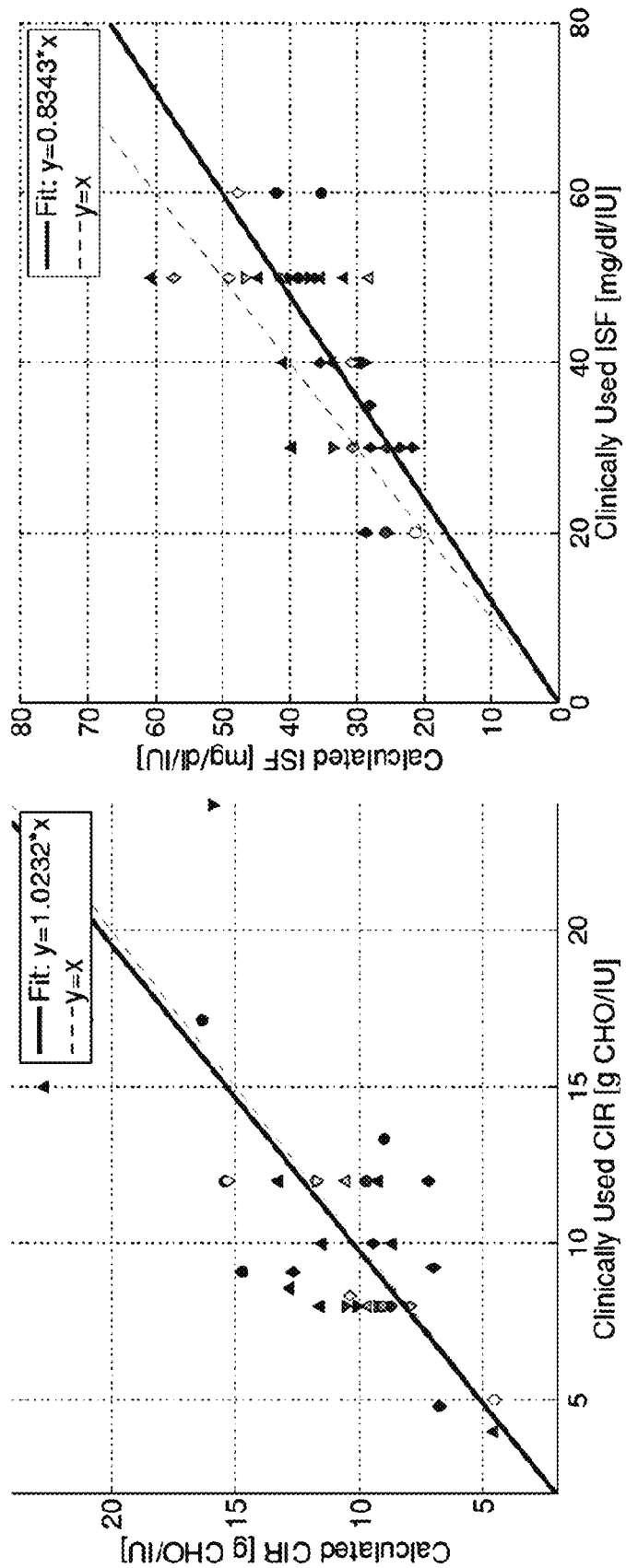
FIG. 13 is a graphical representation for a comparison of calculated and clinical used CIR and ISF values for lunch.
Figure 14:
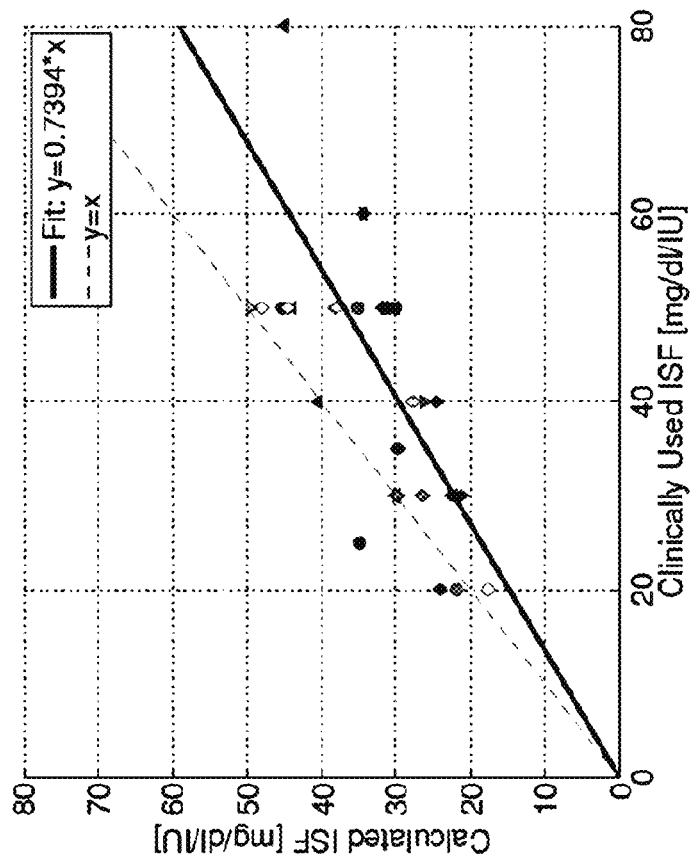
FIG. 14 is a graphical representation for a comparison of calculated and clinical used CIR and ISF values for dinner.
Figure 14:
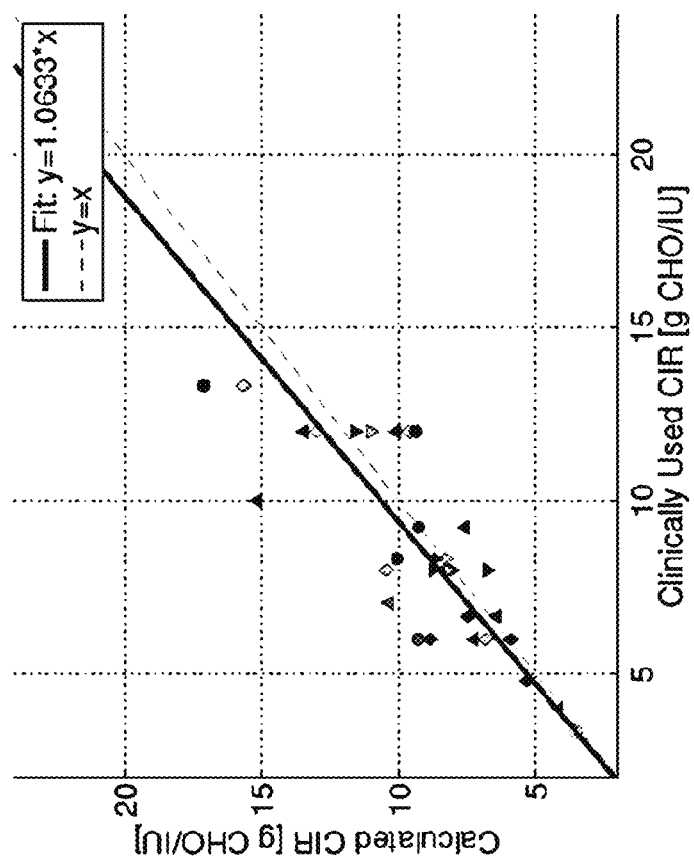

In FIGS. 12 to 14 additionally the comparison between calculated and clinically used CIR and ISF values is shown each of the mealtimes (breakfast—8:00, lunch—13:00, dinner—18:00) separately. Through this more detailed analysis it can, e.g., be seen that the bias between calculated and clinically used ISF values is the smallest for breakfast and increases towards dinner. Additionally, it is visible for the CIR values that the correlation between calculated and clinically used values is the lowest for lunchtime, whereas for both, breakfast and dinner, a very high correlation can be seen. For none of the meals a strong systematic bias in CIR is found.

Another interesting result is found when analyzing those cases where the value of CIR was changed during the course of the study. Comparing, e.g., the difference for the CIR at breakfast to the corresponding average value of $K_2/K_1$ for patient 0051 (see FIG. 10), it was found that this difference decreases significantly with the change of CIR, i.e., the new value tends to be closer to the calculated $K_2/K_1$ than the old one. When analyzing all cases in which the CIR was changed during the trial in a combined manner (all values for all patients and all meals combined) a reduction of the average difference between clinically used CIR and identified $K_2/K_1$ by 7.9% (from 22.2% to 13.3%) is found. This again is an indication that the profiles of $K_2/K_1$ and $K_2$ as from the system identification are related to the "true" patient-specific CIR and ISF values.

However, in the whole analysis it should not be forgotten that the patient and mealtime specific CIR and ISF values used by the patients in the trial (Zschornack et al., Journal of diabetes science and technology, vol. 7, no. 4, pp. 815-823, 2013) have not been verified systematically as part of the clinical protocol, but have only been altered if inadequate settings have been identified by the clinical personal conducting the clinical study. Therefore, the clinically used settings do not necessarily correspond to the best possible ones and difference between identified and clinically used values do not necessarily indicate a flaw of the system identification approach. Nevertheless, having calculated and clinically used values close to each other is an indication for the good quality of the newly proposed methodology.

Based on the results presented above it was found that the proposed method is suitable for the identification of CIR and ISF values from recorded data. Such an approach can, e.g., be useful to guide patients with $T_1DM$, but also less experienced health care providers in the assessment of diabetes diaries and the fine tuning of BC settings. Nowadays, that insulin pumps and CGM devices are increasingly widespread among $T_1DM$ patients, and newer devices are also more and more interconnected, it seems feasible to collect the data needed for such a system identification algorithm automatically in a routine manner. This holds all the more seeing that newer devices have interfaces with smart phones and allow for uploading the collected data. Additionally, diabetes diary apps are nowadays used by many $T_1DM$ patients and facilitate the collection and integration of meal data (which can hardly be collected automatically). The automatic calculation of CIR and ISF values seems thus doable with minimum extra effort.

It should be mentioned, that there is not just a day-to-day variability in glucose dynamics. Additionally, glucose dynamics can also change over time if patients modify their lifestyle and, e.g., experience a change in insulin resistance. The newly proposed method could be used to track such changes and adjust CIR and ISF values.

Based on this reasoning, the following method is proposed. Such method or methodology may also be referred to adapted bolus calculation (ABC). For an example, the characteristics of this method can be summarized as follows:
CGM data is collected with information about bolus injections and meal intakes over N days.
The methodology described above is applied to this dataset and diurnal profiles for $K_2/K_1$ and $K_2$ are identified.

The combined profiles for $-K_2/K_1$ and $-K_2$ can be used to compute a profile for CIR and ISF as a function of daytime. In the simplest case just the average profile (average over the identified profiles for each day) is used.

Based on the identified values of $T_2$ a value for the DIA can be estimated.

The CIR, ISF and DIA values can be applied in a standard BC using formula (1).

As soon as the next day of data becomes available it can either be added to enlarge the size of the dataset or replace the oldest day of data. Using this modified dataset the system identification can be repeated yielding new values for CIR and ISF as a function of daytime. These can replace the current settings in the patient's BC.

Alternatively the cost function in the optimization problem (see (6) above) can be altered in order to give a higher weight to newer data.

The resulting algorithm should be able to track changes in the patient's bolus insulin needs that might occur over a longer period of time (e.g., CIR gets smaller over time due to a change in insulin resistance connected with a gain in the patient's body weight).

Further Examples

So far the ABC has always been implemented and applied in a way that data from several days are collected and fitted using the procedure outlined above. Following, further analyse with regard to the aspect of how much information is needed in order to identify suitable CIR and ISF values using the ABC approach is provided. To analyze this question a test calculation is performed in which the ABC procedure is applied in the following manner:

1. During the first full day of the trial (day 2) the patients are using the standard setting on their BC (BC settings agreed to with the health care provider) to calculate their bolus needs. During this day data is collected for the ABC.
2. The data of day 2 is fitted and the resulting CIR and ISF profiles are used on day 3 for calculating the bolus needs (together with the estimated value of $T_2$ for calculating IOB). The corresponding glucose trajectories are calculated in the Deviation Analyses.
3. Based on the data of the first two days the ABC methodology is used to identify CIR and ISF profiles. The corresponding average profiles are used for calculating the bolus needs on day 4 (together with the average $T_2$ for calculating IOB).
4. Step 3 is repeated for the day 5, 6 and 7. The corresponding database for identification with the ABC strategy is continuously enlarged during this time.

Additionally, as reference scenario also the case of calculating the bolus needs with the clinically used CIR and ISF values was analyzed. This setting will again be referred to as StdBC.

Figure 15:
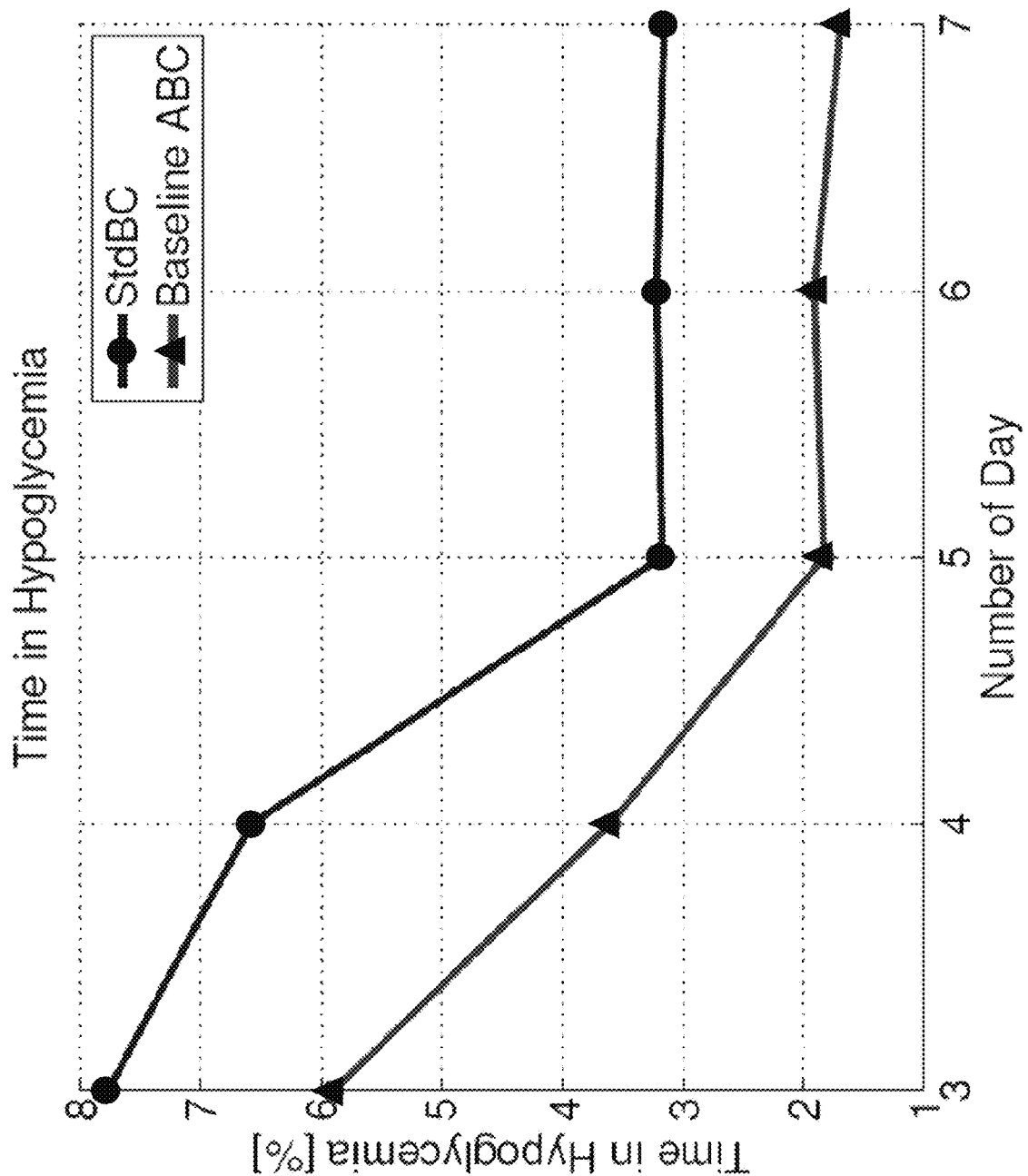
FIG. 15 is a graphical representation of the time in hypoglycemia as function of the day of a virtual trial.
Figure 16:
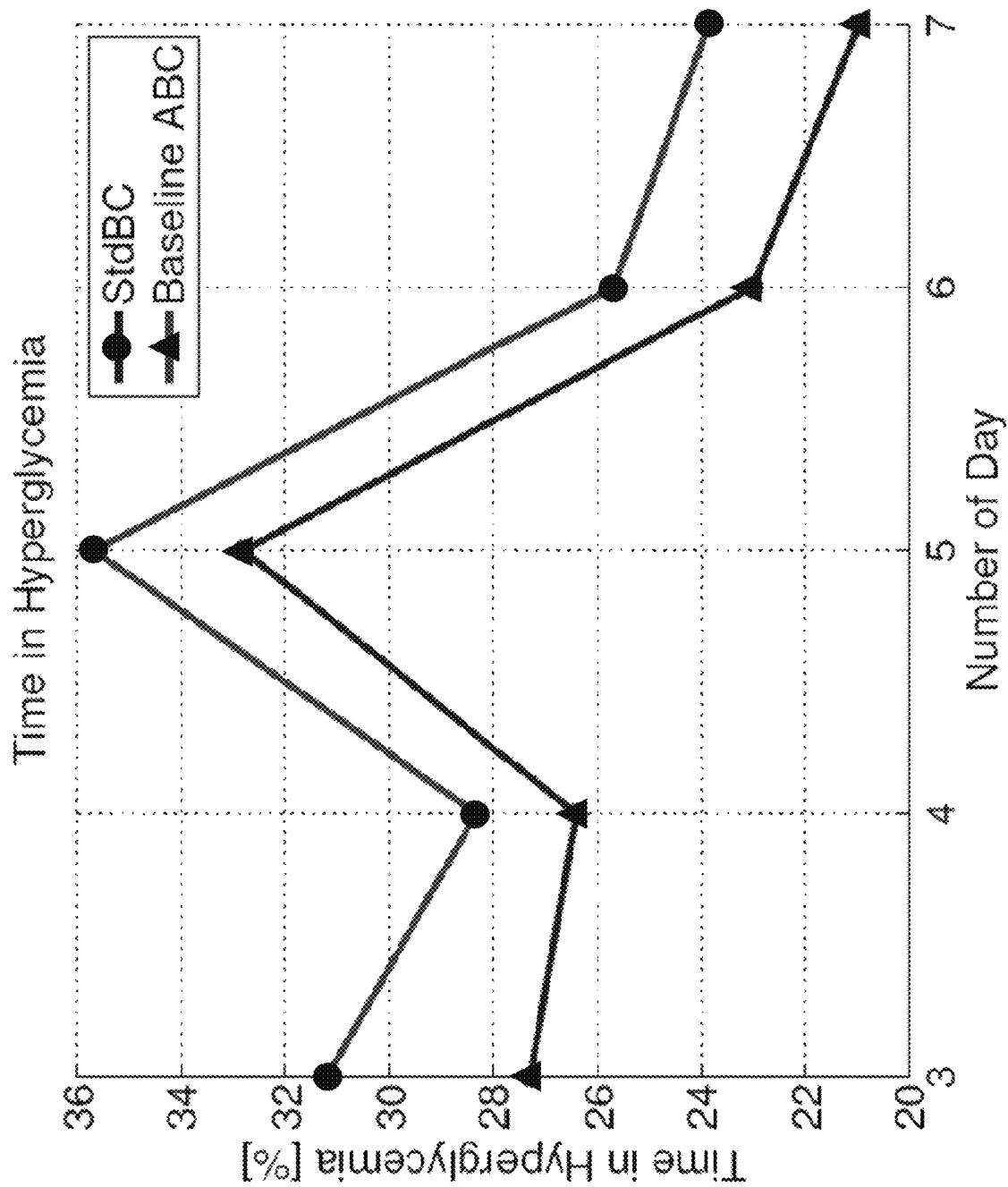
FIG. 16 is a graphical representation of the time in hyperglycemia as a function of the day of a virtual trial.
Figure 17:
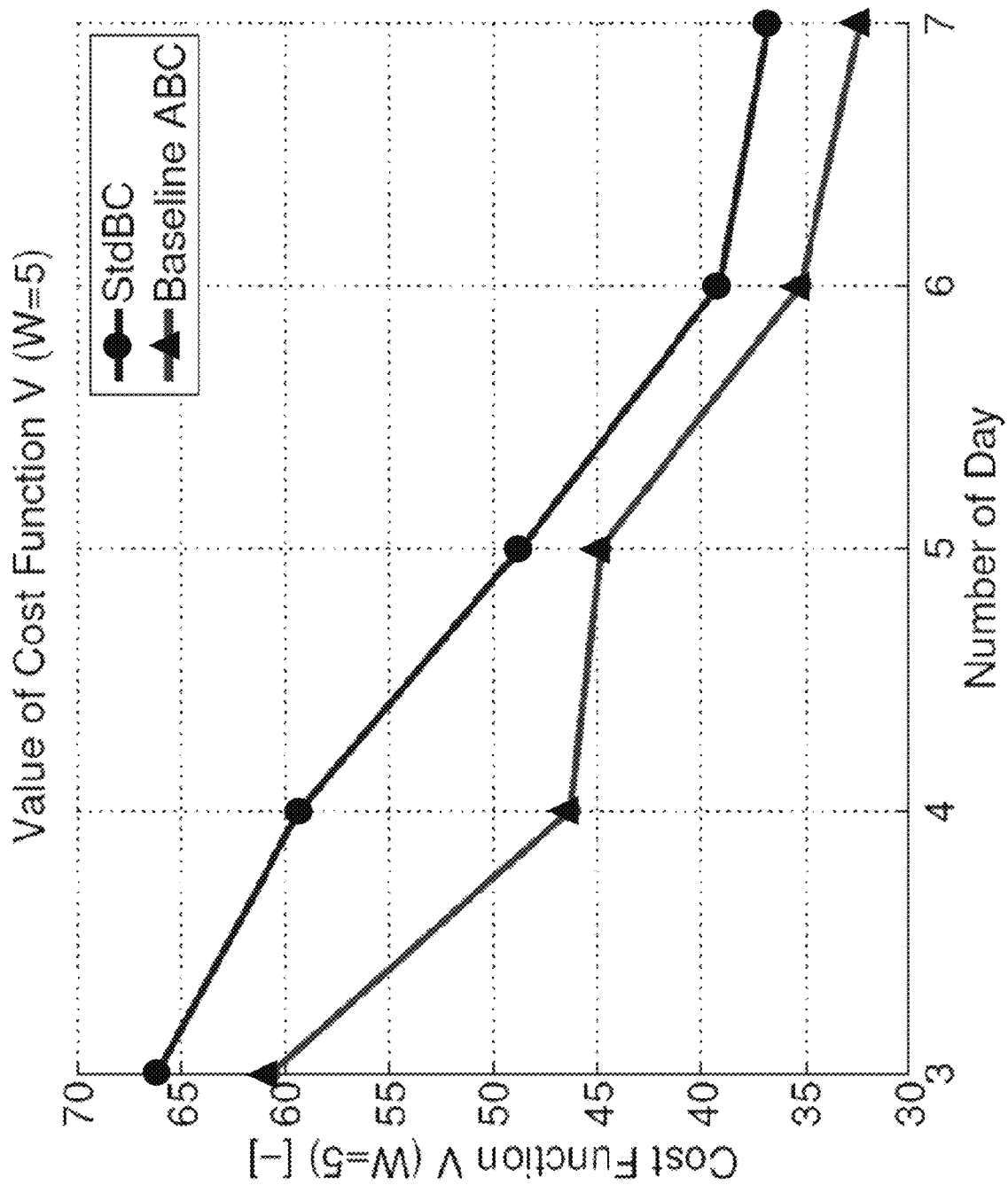
FIG. 17 is a graphical representation of the value of the cost function V (W=5) as a function of the day of the virtual trial.

The resulting glucose trajectories from the Deviation Analyses are analyzed for the time during the day (8:00 until 22:00, or the patient-specific predefined or determined awake time) and with respect to the percentage of time in hypoglycemia, the percentage of time in hypoglycemia as well as the value of cost function V (see (10) below) with W=5. The resulting average values for all 37 patients combined can be seen in FIGS. 15 to 17.

When analyzing those plots it becomes evident that the behavior of ABC and StdBC as a function of the day of the study is quite similar. The curves for time in hypoglycemia, time in hyperglycemia and cost function V are almost parallel to each other with a more or less fixed distance. During the course of the study the time in hypoglycemia and hyperglycemia, as well as V are continuously decreasing (The only exception is for the time in hyperglycemia on day 5.). This general behavior can be explained by a run-in period during the start of the trial. The patients are put into an unfamiliar environment which causes a disruption in their daily routines and most probably leads to a worse BG control in the initial phase of the trial. It is interesting to see that already after one day of data the ABC leads to a lower time in hypoglycemia and a lower value of V than the StdBC. The time in hyperglycemia is comparable for ABC and StdBC, but for all days slightly higher for the ABC. Based on these findings it can be concluded that already one day of data is basically sufficient for the ABC to have a favorable performance. Using a longer dataset, with more days of course, reduces the effect of possible outliers, e.g., days of data that can hardly be explained by the model in the ABC method or days with data of low quality. Additionally, it should also be pointed out that it is not necessarily the best strategy to just keep adding data for the ABC system identification and then compute the average CIR and ISF. Instead it might make more sense to put a higher weight on newer datasets or to discard older datasets from the analysis.

Besides the run-in-effect of the ABC, also an online application of the ABC was studied in which the information of previous meals from the same days are used for adjusting the bolus dosing of subsequent meals. In the baseline ABC data from entire days is fitted and analyzed together. This, however, does not necessarily have to be performed this way. It might, e.g., occur that the bolus amount for a breakfast meal calculated with the CIR and ISF from the ABC leads to hypoglycemia. This would indicate that the bolus amount was too high for the ingested meal and, assuming that the carbohydrate estimate was accurate, that CIR and/or ISF were inappropriate.

The question then is how to adjust the CIR and ISF for lunchtime in order to obtain a better performance for that meal.

Figure 18:
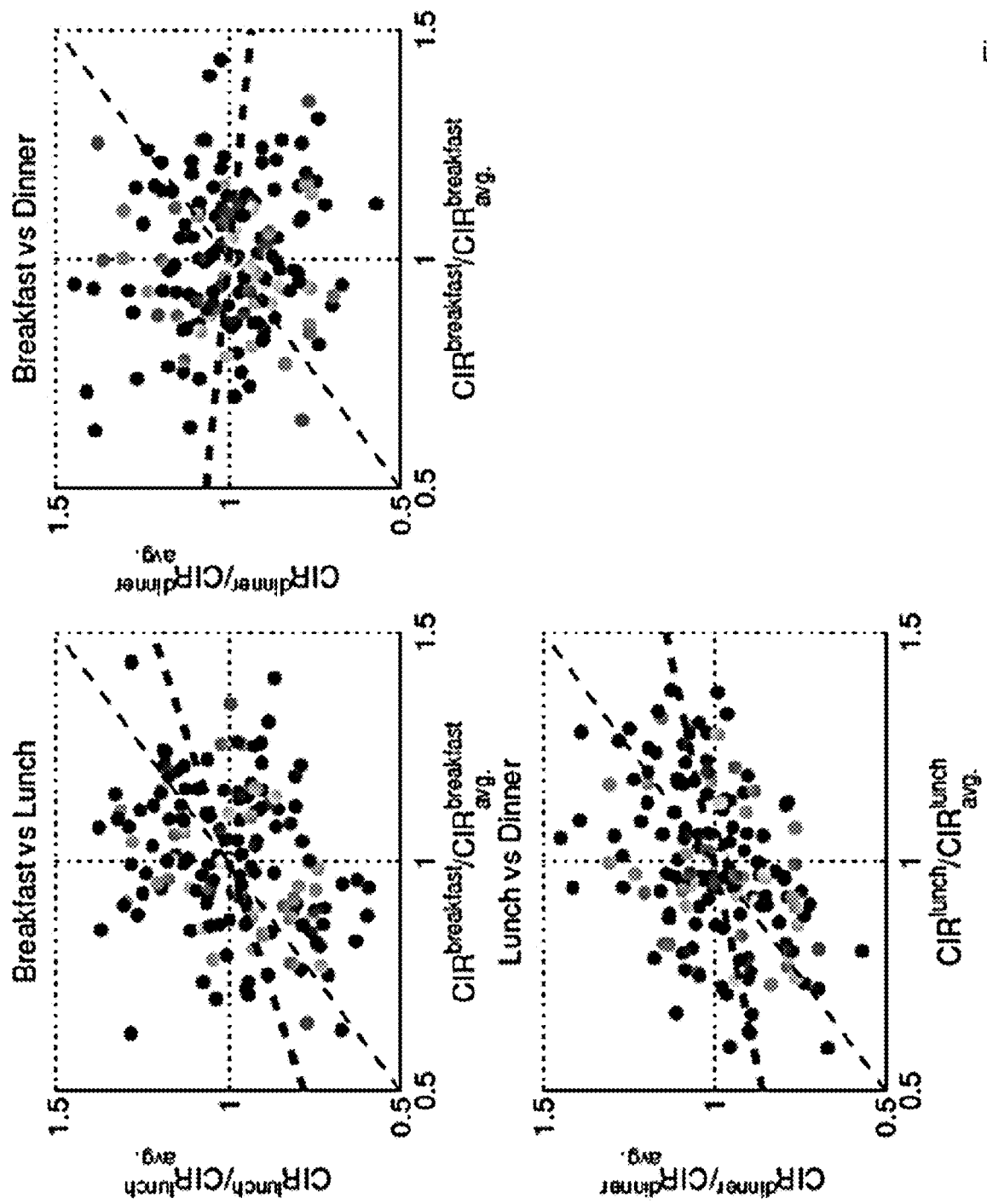
FIG. 18 is a graphical representation of CIR-correlation between identified factors from different meals from the same day.
Figure 19:
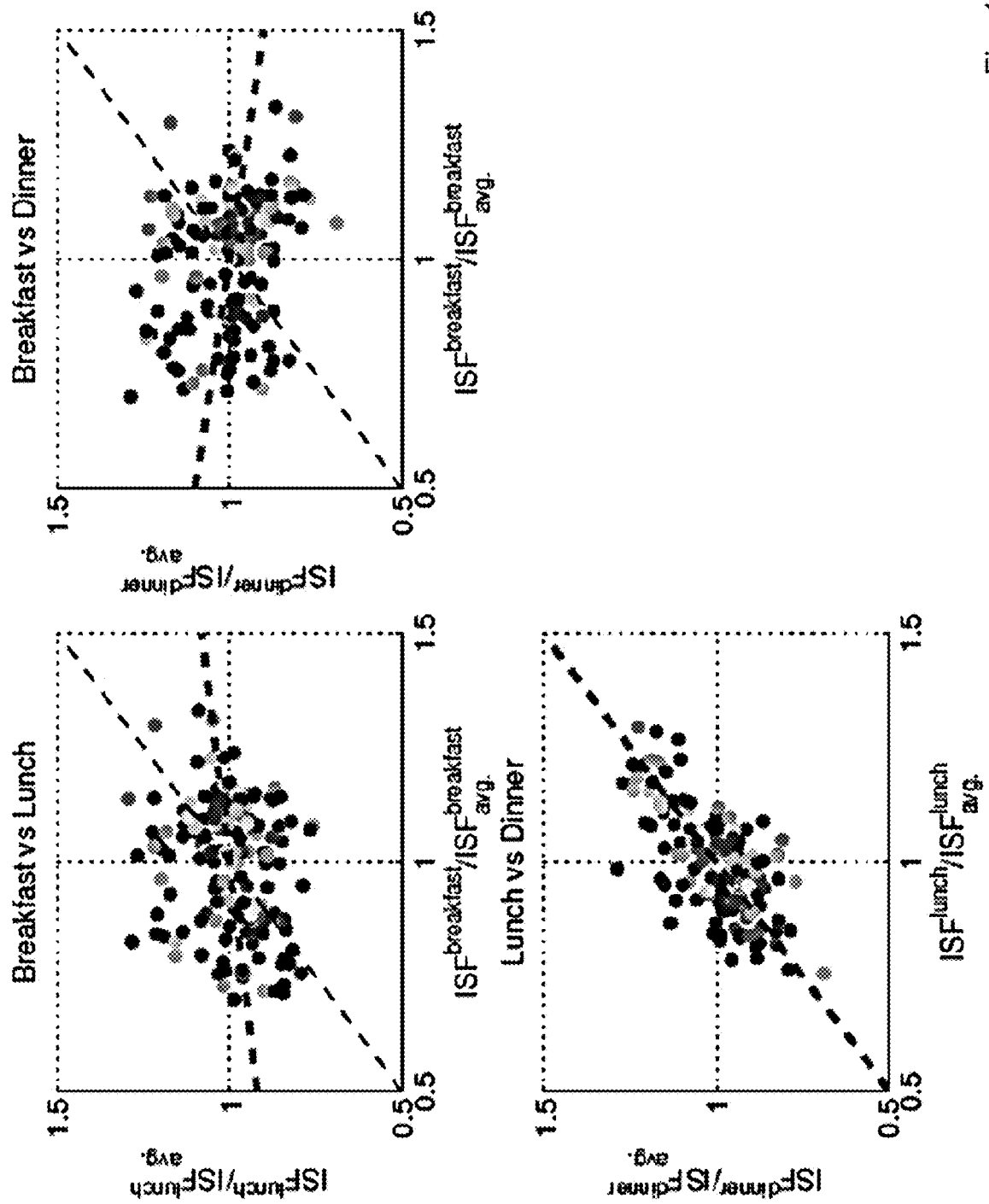
FIG. 19 is a graphical representation of ISF-correlation between identified factors from different meals from the same day.

First the question about the correlation between the CIR and ISF values between different meals of the same day has to be analyzed. In case there is no such correlation it would make no sense to adjust the CIR for lunchtime if the applied CIR for breakfast was too low. In FIG. 18 all identified CIR values from different meals for all patients and all days are plotted against each other, whereas in FIG. 19 the same is done for ISF values. Values are normalized by the average value of the corresponding patient in order to make them comparable between patients. It can be seen that there is no strong and obvious correlation between the CIR values for adjacent meals. Linear regression, however, does reveal that there is a positive correlation between the CIR values for breakfast and lunch, as well as between those for lunch and dinner. Between the factors of breakfast and dinner on the other hand there is no correlation at all. The same hold for the ISF values (Between the ISF values for lunch and dinner even a strong correlation was found). This would indicate for the example given before that, after a breakfast with too much insulin applied, it might be advantageous to increase the CIR and ISF values for computing the bolus needs of the upcoming lunch.

In order to do so the following method is suggested:
1. The data of entire days is used to identify the baseline profiles of CIR and ISF using the ABC methodology outlined above.

2. The CIR and ISF values as suggested by the ABC are used for calculating the bolus needs for breakfast and the corresponding insulin amount is injected.
3. The glucose trajectory after the breakfast meal (from the start of the meal until just before lunchtime) is included into the dataset of the ABC and fitted together with the data of previous days in order to obtain an estimate for the appropriate CIR and ISF for the ingested breakfast.
4. The CIR ($CIR_{present}^{lunch}$) and ISF ($ISF_{present}^{lunch}$) values for the upcoming lunch are then adjusted according to the following formula:

$$CIR_{present}^{lunch} = CIR_{ABC}^{lunch} \cdot \left(1 + f \cdot \frac{CIR_{SysId}^{breakfast} - CIR_{ABC}^{breakfast}}{CIR_{ABC}^{breakfast}}\right) \quad (8.1)$$

$$ISF_{present}^{lunch} = ISF_{ABC}^{lunch} \cdot \left(1 + f \cdot \frac{ISF_{SysId}^{breakfast} - ISF_{ABC}^{breakfast}}{ISF_{ABC}^{breakfast}}\right) \quad (8.2)$$

with $CIR_{ABC}^{lunch}$ and $ISF_{ABC}^{lunch}$, for the adapted bolus calculation ABC, the CIR and ISF for lunchtime as from the average diurnal profile of the ABC (adapted bolus calculation), and $CIR_{ABC}^{breakfast}$ and $ISF_{ABC}^{breakfast}$ the corresponding values for breakfast from the average diurnal profile. $CIR_{SysId}^{breakfast}$ and $ISF_{SysId}^{breakfast}$, on the other hand, are the CIR and ISF factor identified from the postprandial glucose trajectory of the breakfast ingested earlier the same day. Factor f is a tuning parameter. In case it is set to 0 the information from the breakfast earlier the same day is ignored, whereas setting it to 1 assumes that the same relative offset compared to the average diurnal profile that was observed for breakfast will also occur at lunchtime.

5. The present CIR and ISF values are used to calculate the insulin bolus dose for lunch which is then injected.
6. Just before dinner the data of the same day is fitted with the ABC methodology in order to obtain estimates for CIR and ISF values that would have been appropriate for lunch ($CIR_{SysId}^{lunch}$ and $ISF_{SysId}^{lunch}$). The CIR and ISF for dinner is then adjusted analogously to the procedure for correcting the lunchtime factors:

$$CIR_{present}^{dinner} = CIR_{ABC}^{dinner} \cdot \left(1 + f \cdot \frac{CIR_{SysId}^{lunch} - CIR_{ABC}^{lunch}}{CIR_{ABC}^{lunch}}\right) \quad (9.1)$$

$$ISF_{present}^{dinner} = ISF_{ABC}^{dinner} \cdot \left(1 + f \cdot \frac{ISF_{SysId}^{lunch} - ISF_{ABC}^{lunch}}{ISF_{ABC}^{lunch}}\right) \quad (9.2)$$

This method has been tested using the data (cf. Zschornack et al., *Evaluation of the performance of a novel system for continuous glucose monitoring*, Journal of diabetes science and technology, vol. 7, no. 4, pp. 815-823, 2013) for different factors of f (between 0 and 2). The days 2 through 6 have been used for identifying an average diurnal profile, whereas on day 7 the strategy outline above is applied. The results have been analyzed with respect to the percentage of time in hypoglycemia, the percentage of time in hyperglycemia, as well as with respect to the value of cost function V (with W=5):

$$V = t_{hyper}/t_{tot} + W \cdot t_{hypo}/t_{tot} \quad (10)$$

V has been defined that is the weighted sum (with weighting factor W) of time in hypoglycemia ($t_{hypo}$) and hyperglycemia ($t_{hyper}$), both normalized by the total time considered for the performance assessment ($t_{tot}$).

Figure 20:
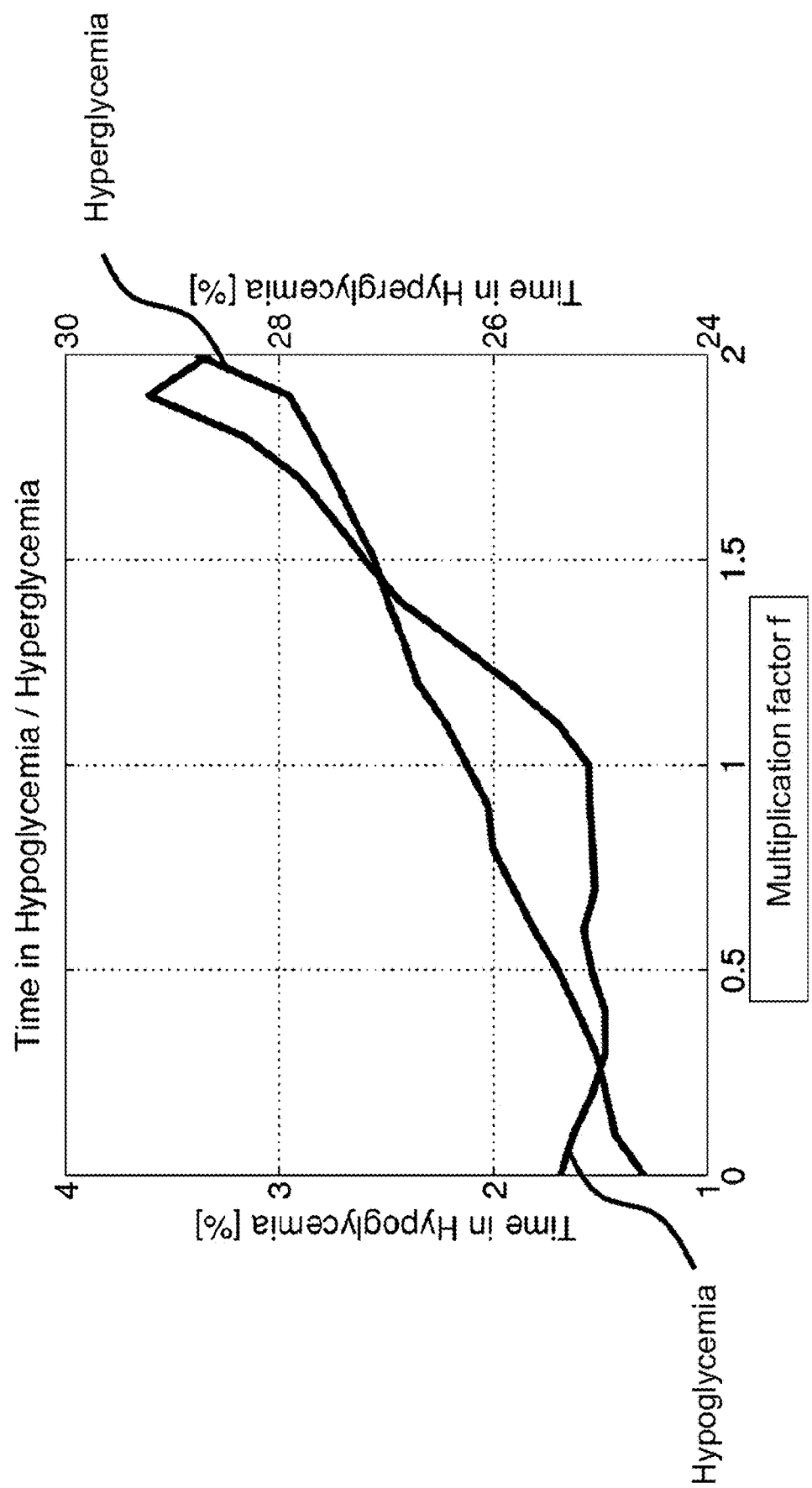
FIG. 20 is a graphical representation of an effect of including information from last meal for calculation of next bolus: time in hypoglycemia and hyperglycemia as function of factor f.
Figure 21:
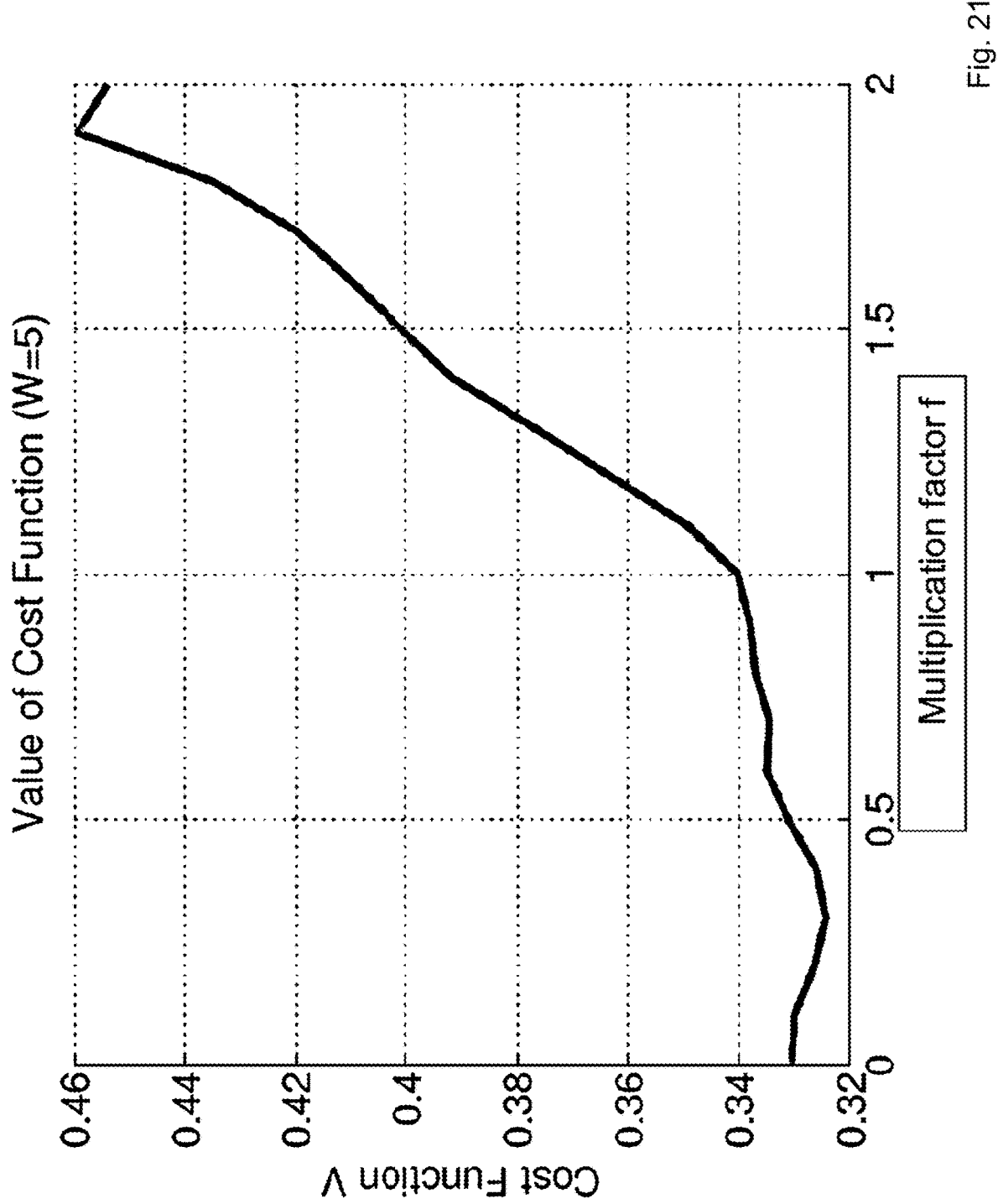
FIG. 21 is a graphical representation of an effect of including information from last meal for calculation of next bolus: value of cost function V (W=5) as a function of factor f.

The results of this evaluation are plotted as a function of f in FIGS. 20 and 21. It can be seen that for f between 0 and 1 the time in hypoglycemia and the cost function V don't change much, but start increasing rapidly for f values larger than 1. The time in hyperglycemia on the other hand increase almost linearly between f=0 and f=2. The lowest value for V is found for f=0.3. This is because of a slight drop for the time in hypoglycemia (from 1.69% to 1.48%).

The features disclosed in this specification, the figures and/or the claims may be material for the realization of various embodiments, taken in isolation or in various combinations thereof.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method of administering insulin to a subject using an insulin delivery device, the method comprising:
    (a) receiving glucose measurement data from a continuous glucose sensor;
    (b) using a processor to determine an insulin bolus dosage to be administered based on:
        a glucose level derived from the glucose measurement data;
        a carbohydrate-to-insulin ratio (CIR); and
        an insulin sensitivity factor (ISF);
    wherein step (b) further comprises at least one of:
        (i) determining the CIR in response to the subject's carbohydrate-to-insulin ratio for at least one of
            a current meal;
            a previous meal, wherein the current meal is the next meal eaten after the previous meal; and
            a time period from starting the previous meal until before starting the current meal;
        (ii) determining the ISF in response to the subject's insulin sensitivity factor for at least one of
            the current meal;
            the previous meal; and
            the time period from starting the previous meal until before starting the current meal;
    (c) using the processor of step (b) to automatically transmit the insulin bolus dosage to the insulin delivery device; and
    (d) prompting the subject to administer the insulin bolus dosage with the insulin delivery device.

2. The method of claim 1, wherein determining the CIR further comprises expressions indicative of:
    total amount of insulin administered within a first time interval; and
    total amount of carbohydrates ingested by the subject within a second time interval.

3. The method according to claim 1, wherein the insulin bolus dosage is determined based on the following formula:

$$\text{Bolus} = \frac{CHO}{CIR} + \frac{G_{pre} - G_{target}}{ISF} - IOB$$

wherein CHO is carbohydrate content of a meal in grams, $G_{pre}$ is preprandial glucose level, $G_{target}$ is a target glucose level for the postprandial glucose level, ISF is the insulin sensitivity value, CIR is the carbohydrate-to-insulin value, and IOB is insulin-on-board.

4. The method according to claim 1, further comprising:
determining the insulin bolus dosage for a lunch meal following a previous breakfast meal ingested on the present day ($CIR_{present}^{breakfast}$); and
determining, for the lunch meal, the present CIR value ($CIR_{present}^{lunch}$) and the present ISF value ($ISF_{present}^{lunch}$) as follows:

$$CIR_{present}^{lunch} = CIR_{ABC}^{lunch} \cdot \left(1 + f \cdot \frac{CIR_{SysId}^{breakfast} - CIR_{ABC}^{breakfast}}{CIR_{ABC}^{breakfast}}\right)$$

$$ISF_{present}^{lunch} = ISF_{ABC}^{lunch} \cdot \left(1 + f \cdot \frac{ISF_{SysId}^{breakfast} - ISF_{ABC}^{breakfast}}{ISF_{ABC}^{breakfast}}\right)$$

wherein
$CIR_{ABC}^{lunch}$ and $ISF_{ABC}^{lunch}$ are, for an adapted bolus calculation ABC, the carbohydrate-to-insulin ratio and the insulin sensitivity values for the lunch meal derived from an average diurnal glucose level profile for the person;
$CIR_{ABC}^{breakfast}$ and $ISF_{ABC}^{breakfast}$ are the carbohydrate-to-insulin ratio and the insulin sensitivity values for breakfast meal derived from the average diurnal glucose level profile for the person;
$CIR_{SysId}^{breakfast}$ and $ISF_{SysId}^{breakfast}$ are the carbohydrate-to-insulin ratio and the insulin sensitivity values determined from, with respect to the breakfast meal, a postprandial glucose trajectory of the previous breakfast meal ingested earlier on the present day for the person; and
factor f is a tuning parameter.

5. The method according to claim 1, further comprising:
determining the insulin bolus dosage for a dinner meal following a previous lunch meal ingested on the present day; and
determining, for the dinner meal, the present CIR value ($CIR_{present}^{dinner}$) and the present ISF value ($ISF_{present}^{dinner}$) as follows:

$$CIR_{present}^{dinner} = CIR_{ABC}^{dinner} \cdot \left(1 + f \cdot \frac{CIR_{SysId}^{lunch} - CIR_{ABC}^{lunch}}{CIR_{ABC}^{lunch}}\right)$$

$$ISF_{present}^{dinner} = ISF_{ABC}^{dinner} \cdot \left(1 + f \cdot \frac{ISF_{SysId}^{lunch} - ISF_{ABC}^{lunch}}{ISF_{ABC}^{lunch}}\right)$$

wherein
$CIR_{ABC}^{dinner}$ and $ISF_{ABC}^{dinner}$ are, for the adapted bolus calculation ABC, the carbohydrate-to-insulin ratio and the insulin sensitivity values for dinner meal derived from the average diurnal glucose level profile for the person;
$CIR_{ABC}^{lunch}$ and $ISF_{ABC}^{lunch}$ are the carbohydrate-to-insulin ratio and the insulin sensitivity values for the previous lunch meal derived from the average diurnal glucose level profile for the subject;
$CIR_{SysId}^{lunch}$ and $ISF_{SysId}^{lunch}$ are the carbohydrate-to-insulin ratio and the insulin sensitivity values determined from, with respect to the previous lunch meal, a postprandial glucose trajectory of the previous lunch meal ingested earlier on the present day for the person; and
factor f is a tuning parameter.

6. A non-transitory computer readable medium having stored thereon computer-executable instructions for performing the method according to claim 1.

7. A device having one or more processors configured to execute the method of claim 1, the device selected from the group consisting of: an insulin pump; an insulin pen; remote control device configured to remotely control an insulin pump or an insulin pen; continuous glucose meter, continuous blood glucose meter, controller of a continuous glucose meter, controller of a continuous blood glucose meter, and portable electronic device.

* * * * *